(12) United States Patent
Nakamura et al.

(10) Patent No.: US 7,496,470 B2
(45) Date of Patent: Feb. 24, 2009

(54) ELECTRONIC APPARATUS AND DISK PROTECTION METHOD

(75) Inventors: Koji Nakamura, Akiruno (JP); Tatsuya Aoyagi, Yachikawa (JP); Toru Mamata, Akiruno (JP); Kinji Taki, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 53 days.

(21) Appl. No.: 11/304,616

(22) Filed: Dec. 16, 2005

(65) Prior Publication Data

US 2006/0136168 A1 Jun. 22, 2006

(30) Foreign Application Priority Data

Dec. 17, 2004 (JP) ............... 2004-366875

(51) Int. Cl.
*G01P 15/00* (2006.01)
(52) U.S. Cl. .................................. 702/141
(58) Field of Classification Search ............. 702/58, 702/91, 104, 115, 141, 183–186; 360/31, 360/60, 75
See application file for complete search history.

(56) References Cited

U.S. PATENT DOCUMENTS 5,835,298 A * 11/1998 Edgerton et al. ............ 360/75
5,859,358 A * 1/1999 Wood et al. ................. 73/9
5,956,194 A * 9/1999 Ohmi et al. .................. 360/60
6,359,746 B1 * 3/2002 Kakekado et al. ........... 360/75
2002/0009031 A1 * 1/2002 Rumpf et al. ............... 369/53.18
2002/0027733 A1 * 3/2002 Kikuta et al. ................ 360/60
2003/0210513 A1 * 11/2003 Yen et al. .................... 361/681

FOREIGN PATENT DOCUMENTS

JP 2004-146036 5/2004

* cited by examiner

*Primary Examiner*—Edward Raymond
*Assistant Examiner*—Mohamed Charioui
(74) *Attorney, Agent, or Firm*—Pillsbury Winthrop Shaw Pittman, LLP

(57) ABSTRACT

An electronic apparatus includes a body, a triaxial acceleration sensor which is built in the body and includes a long axis and a short axis, a disk device built in the body, a calculation unit that calculates a value on a basis of an acceleration value which is detected by the triaxial acceleration sensor and is output in a direction perpendicular to the long axis and to the short axis, a setting unit that sets a threshold in a state of the body in which a plane formed by the long axis and the short axis is approximately parallel to a direction of action of gravitational acceleration, and a controller that starts protection of the disk device on a basis of a result of comparison between the value calculated by the calculation unit and the threshold.

15 Claims, 26 Drawing Sheets

FIG. 12

| TYPE OF FLUCTUATION | DATA IN USE |
|---|---|
| FREE FALL | SYNTHETIC ACCELERATION |
| APPLICATION OF STRONG EXTERNAL FORCE | SYNTHETIC ACCELERATION |
| FLUCTUATION WITH ROTATION ON Z AXIS | Z-AXIS ACCELERATION VARIATION Z-AXIS ACCELERATION |
| FLUCTUATION WITH ROTATION ON X AXIS | X-AXIS ACCELERATION VARIATION X-AXIS ACCELERATION |
| FLUCTUATION WITH ROTATION ON Y AXIS | Y-AXIS ACCELERATION VARIATION Y-AXIS ACCELERATION |

FIG. 14

| TYPE OF FLUCTUATION | SENSITIVITY LEVEL | | |
|---|---|---|---|
| | LEVEL 3 | LEVEL 2 | LEVEL 1 |
| FREE FALL | ○ | ○ | ○ |
| APPLICATION OF STRONG EXTERNAL FORCE | ○ | ○ | ○ |
| FLUCTUATION WITH ROTATION ON Z AXIS | ○ | ○ | × |
| FLUCTUATION WITH ROTATION ON X AXIS | ○ | × | × |
| FLUCTUATION WITH ROTATION ON Y AXIS | ○ | × | × |

FIG. 15

| SENSITIVITY LEVEL | SCENE OF USE OF PC |
|---|---|
| 3 | PC IS USED ON DESK |
| 2 | PC IS USED ON LAP OR IN CAR |
| 1 | MUSIC IS PLAYED BACK WHILE PC IS INCLINED (VERTICALLY) AND HELD IN ONE HAND |

FIG. 19

| CASE IN USE | | USER SETTING OF SENSITIVITY LEVEL | DEFAULT VALUE |
|---|---|---|---|
| AC POWER ADAPTER | | SELECTION FROM FOUR KINDS (LEVEL 3/2/1/OFF) | 3 |
| BATTERY POWER | ORDINARY | SELECTION FROM FOUR KINDS (LEVEL 3/2/1/OFF) | 2 |
| | TABLET | SELECTION FROM FOUR KINDS (LEVEL 3/2/1/OFF) | 1 |
| | MUSIC PLAYBACK | SELECTION FROM FOUR KINDS (LEVEL 3/2/1/OFF) | 1 |

FIG. 22

| EVENT ON COMPUTER 1 | USER SETTING | DEFAULT VALUE |
|---|---|---|
| CLOSE DISPLAY UNIT | SELECTION FROM TWO KINDS (ENABLE/DISABLE) | ENABLE |
| REMOVE AC ADAPTER | SELECTION FROM TWO KINDS (ENABLE/DISABLE) | ENABLE |

ELECTRONIC APPARATUS AND DISK PROTECTION METHOD

CROSS-REFERENCE TO RELATED APPLICATIONS

This application is based upon and claims the benefit of priority from the prior Japanese Patent Applications No. 2004-366875, filed on Dec. 17, 2004; the entire contents of which are incorporated herein by reference.

BACKGROUND OF THE INVENTION

1. Field of the Invention

The present invention relates to a disk protection method and particularly to a method for protecting a disk device built in an electronic apparatus.

2. Description of the Related Art

Various electronic apparatuses such as computers have been equipped with magnetic disk devices in recent years. The magnetic disk devices have low tolerance to vibration and shock.

If vibration, shock, etc. occurs in a magnetic disk device in the middle of writing of data in a magnetic disk by use of a magnetic head of the magnetic disk device or in the middle of reading of data written in a magnetic disk by use of the magnetic head, there is a possibility that the magnetic head and the magnetic disk will collide with each other so as to be broken.

To avoid this trouble, a mechanism for setting a condition for retracting a magnetic head and executing retraction of the magnetic head on the basis of the set condition has been disclosed in JP-A-2004-146036 (see JP-A-2004-146036 (page 11, FIG. 6)).

Developers have proceeded with development of a triaxial acceleration sensor as a sensor for detecting fluctuation of an electronic apparatus with a built-in magnetic disk.

For example, the triaxial acceleration sensor can detect various fluctuations compared with a biaxial acceleration sensor. Accordingly, it is preferable that the triaxial acceleration sensor is used for detecting various fluctuations to prevent any trouble of the magnetic head and the magnetic disk from being caused by the various fluctuations detected.

SUMMARY OF THE INVENTION

The invention provides an electronic apparatus and a disk protection method in which a magnetic head is retracted on the basis of acceleration detected by a triaxial acceleration sensor.

According to an aspect of the present invention, an electronic apparatus includes a body, a triaxial acceleration sensor, a disk device which is built in the body, and a controller which executes protection of the disk device in accordance with a type of fluctuation related to a state of the electronic apparatus.

According to another aspect of the present invention, a disk protection method executed in an electronic apparatus including a body, a triaxial acceleration sensor, and a disk device built in the body, the disk protection method includes recognizing a state of the electronic apparatus is, and executing protection of the disk device in accordance with a type of fluctuation related to the recognized state of the electronic apparatus.

According to the invention, there can be provided an electronic apparatus and a disk protection method in which a magnetic head is retracted on the basis of acceleration detected by a triaxial acceleration sensor.

BRIEF DESCRIPTION OF THE DRAWINGS

FIG. 12 is a table showing the relation between the kind of fluctuation applied on the computer and data required for judging the kind of fluctuation;

FIG. 14 is a table showing an example of the relation between the kind of fluctuation applied on the computer and the level of sensitivity;

FIG. 15 is a table for explaining an example of selection of the sensitivity level in accordance with the scene of use of the computer;

FIG. 19 is a view showing an example of the utility setting screen displayed for the user to set the sensitivity level, etc;

FIG. 22 is a table showing events to temporarily increase the sensitivity level and presence/absence of default selection of the events;

DETAILED DESCRIPTION OF THE INVENTION

An embodiment of the invention will be described below with reference to the drawings.

Figure 1:
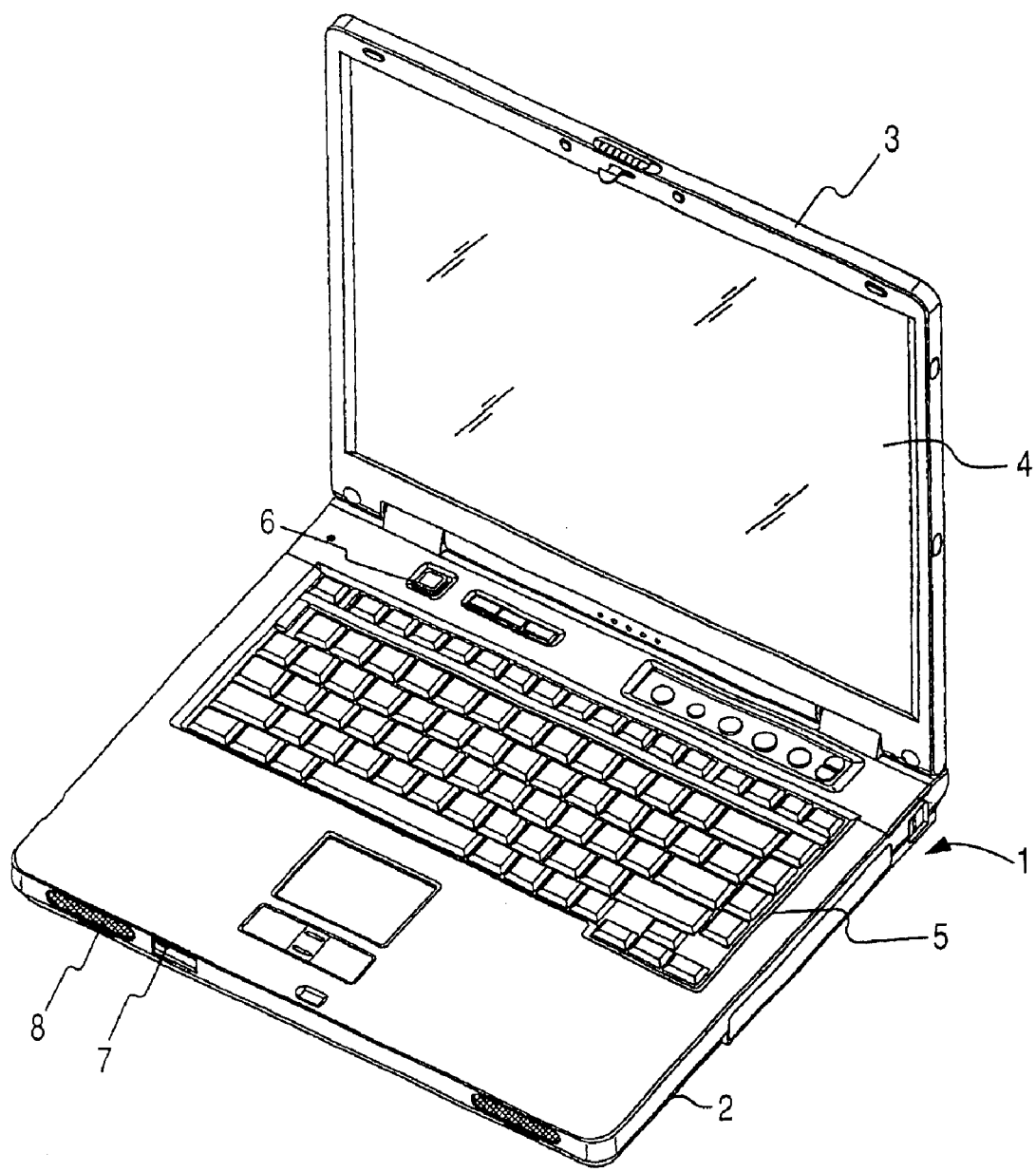
FIG. 1 is a view showing a state in which a display unit of a notebook type personal computer is opened relative to a body of the notebook type personal computer.

FIG. 1 is a view showing a state in which a display unit 3 of a notebook type personal computer (hereinafter referred to as "computer") 1 is opened with respect to a body 2.

The computer 1 includes a body 2, and a display unit 3. A display device with an LCD (Liquid Crystal Display) 4 is incorporated in the display unit 3. The LCD 4 is located approximately in the center of the display unit 3.

The display unit 3 is attached to the body 2 so that the display unit 3 can rotate between an open position and a close position. The body 2 is substantially shaped like a box. A keyboard unit 5, a power button 6 for powering the computer 1 on/off, etc. are disposed in an upper surface of the body 2. The power button 6 is pushed down when use of the computer 1 starts.

A music reproducing switch 7 and a speaker 8 are disposed in a front surface of the body 2. For example, the music reproducing switch 7 is a slide type switch which can take a music reproducing stop position and a music reproducing start portion. When a user does not want to listen to music, the music reproducing switch 7 is moved to the reproducing stop position. On the other hand, when the user wants to listen to music, the music reproducing switch 7 is moved to the reproducing start position.

The speaker a outputs sound.

Figure 2:
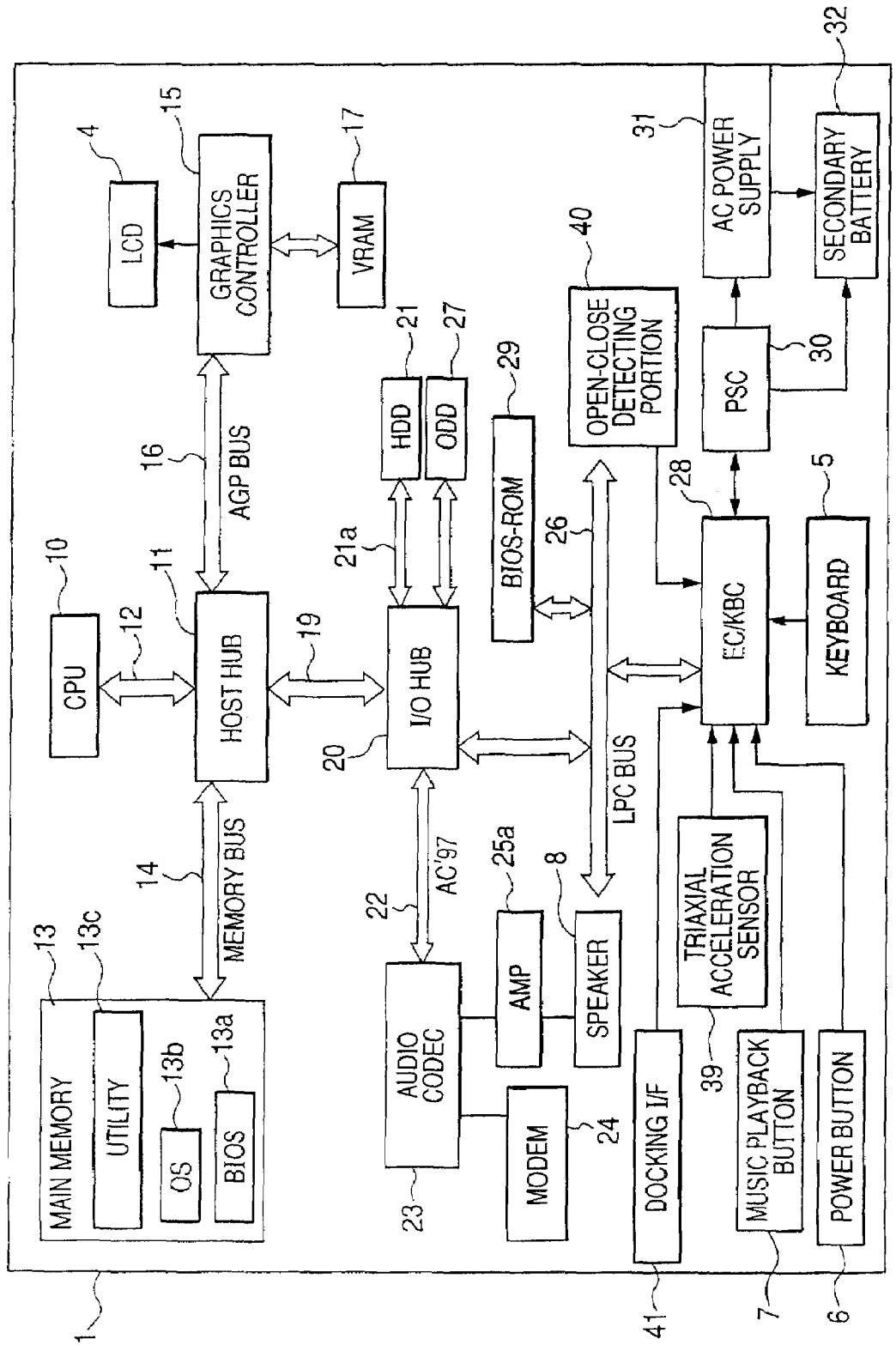
FIG. 2 is a diagram for explaining the hardware configuration of the computer.

The hardware configuration of the computer 1 will be described below with reference to FIG. 2.

A CPU 10, a main memory 13, a graphics controller 15 and an I/O hub 20 are connected to a host hub (first bridge circuit) 11.

The host hub 11 is connected to the CPU 10 through a system bus 12. The host hub 11 has a built-in memory controller for controlling access to the main memory 13.

The CPU 10 is a main processor for controlling the operation of the computer 1. The CPU 10 executes an operating system (OS) 13b and application and utility programs 13c loaded from a hard disk drive (HDD) 21 as an external storage device to the main memory 13 through a memory bus 14. The CPU 10 also executes a BIOS (Basic Input Output System) 13a loaded from a BIOS-ROM 29 to the main memory 13.

The graphics controller 15 connected to the host hub 11 through an AGP (Accelerated Graphics Port) bus 16 outputs a digital display signal to the LCD 4. A video memory (VRAM) 17 is connected to the graphics controller 15. Data drawn on the video memory 17 by the OS/application program are displayed on the LCD 4 by the graphics controller 15.

The I/O hub (second bridge circuit) 20 connected to the host hub 11 through a private bus such as a hub interface controls respective devices on an LPC (low pin count) bus 26.

The I/Q hub 20 has a built-in parallel ATA controller etc. The HDD 21 and an ODD 27 are connected to the I/O hub 20 through a parallel ATA 21a. The operating system (OS), the application and utility programs and data generated by the user's using the application program are stored in the HDD 21.

An audio codec 23 is connected to the I/O hub 20 through an AC (Audio codec) 97 (22). The audio codec 23 is a kind of sound input/output codec. The audio codec 23 has an input/output sound codec portion, and an analog modem data processing portion.

A modem 24 and an amplifier (AMP) 25a are connected to the audio codec 23. The AMP 25a amplifies a sound signal generated by the audio codec 23. The sound signal amplified by the AMP 25a is fed to the speaker 8, so that the speaker a outputs acoustic wave of an audible frequency band.

The modem 24 modulates a digital signal to an analog signal and demodulates an analog signal to a digital signal.

An embedded controller/keyboard controller In (EC/KBC) 28 and the BIOS-ROM 29 are connected onto the LPC bus 26.

The BIOS (Basic Input Output System) 13a is stored in the BIOS-ROM 29.

The embedded controller/keyboard controller IC (EC/KBC) 28 is a one-chip microcomputer in which an embedded controller for performing power management, etc. and a keyboard controller for controlling the keyboard (KB) unit 5 are integrated.

The power button 6, the music reproducing button, a PSC (Power Supply Controller) 30, the keyboard 5, a triaxial acceleration sensor 39, an open-close detection portion 40 and a docking interface 41 are connected to the EC/KBC 28. An AC adapter 31 and a secondary battery 32 are connected to the PSC 30.

When the user operates the power button 6, the EC/KBC 28 detects the operation of the power button 6. When the operation of the power button 6 is detected, the EC/KBC 28 gives a notice to the PSC 30 to start power supply, for example, to the system of the computer 1. The PSC 30 controls the AC adapter 31 or the secondary battery 32 to start power supply to the system of the computer 1 on the basis of the notice received from the EC/KBC 28.

The PSC 30 detects removal of the AC adapter 31 from the computer 1. The PSC 30 further gives the EC/KBC 28 notice of the removal of the AC adapter 31 from the computer 1.

The music reproducing switch 7 is a switch for controlling music reproducing start/stop, etc. The user's operation of the music reproducing switch 7 is detected by the EC/KBC 28. After the EC/KBC 28 detects a switch operating event, the EC/KBC 28 controls reproducing/stop of a music reproducing application. After the EC/KBC 28 detects a switch operating event, the EC/KBC 28 further recognizes the state of the computer 1 as a music reproducing mode.

The triaxial acceleration sensor 39 outputs the detected acceleration to the EC/KBC. The triaxial acceleration sensor 39 will be described later in detail.

The open-close detection portion 40 detects the opening/closing of the display unit 4 with respect to the body 2. The open-close detection portion 40 detects movement of the display unit 4 from the open position to the close position and movement of the display unit 4 from the close position to the open position relative to the body 2 and gives the EC/KBC 28 notice of the detected movement.

A so called docker which is a functional expansion unit is connected to the docking interface 41. When the docker is connected to the docking interface 41, the EC/KBC 28 recognizes the connection of the docker.

Next, the relation between the output of the triaxial acceleration sensor 39 and axes of space coordinates will be described.

Figure 3:
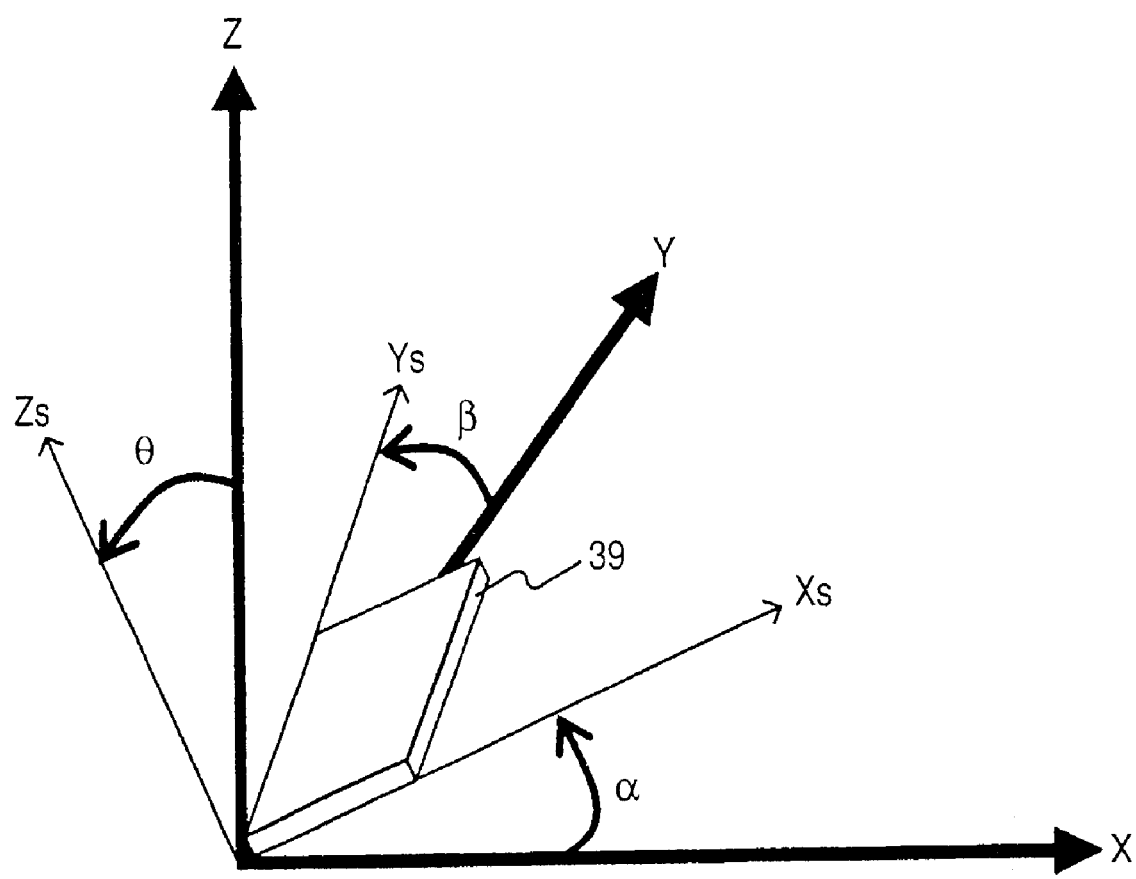
FIG. 3 is a view showing the relation between outputs of a triaxial acceleration sensor and space coordinate axes.

FIG. 3 is a graph showing the relation between the output of the triaxial acceleration sensor and axes of space coordinates.

In space coordinates (X, Y, Z), a Z axis is located to be perpendicular to an X-Y plane. Force of gravity g acts in a direction opposite to the Z axis.

The triaxial acceleration sensor 39 is provided in the space coordinates (X, Y, Z). The relation between coordinates (Xs, Ys, Zs) of three axes of the triaxial acceleration sensor 39 and the space coordinates (X, Y, Z) is as follows. An angle α is formed between the Xs axis of the acceleration sensor 39 and the X-Y plane of the space coordinates (X, Y, Z). An angle β is formed between the Ys axis of the acceleration sensor 39 and the X-Y plane. An angle θ is formed between the Zs axis of the acceleration sensor 39 and the Z axis of the space coordinates (X, Y, Z). Assume now that the X-axis direction of the triaxial acceleration sensor 39 is a short axis and the Y-axis direction of the triaxial acceleration sensor 39 is a long axis.

Static acceleration output from the triaxial acceleration sensor 39 in a stationary state of the triaxial acceleration sensor 39 is given as measured values of acceleration components (Ax [G], Ay [G], AZ [G]) obtained by decomposing gravity g into the coordinates (Xs, YS, Zs) of the three axes of the acceleration sensor 39.

Assume now that the specifications for the acceleration sensor 39 are defined so that the acceleration sensor 39 outputs the following acceleration components.

$$Ax = g \times \sin \alpha \, [G]$$

$$Ay = g \times \sin \beta \, [G]$$

$$Az = g \times \cos \theta \, [G]$$

The specifications for the acceleration sensor 39 are defined so that synthetic acceleration A in a stationary state of the acceleration sensor 39 satisfies the following equation.

$$A = \sqrt{(Ax^2 + Ay^2 + Az^2)} = g = 1 \, [G]$$

Dynamic acceleration output from the triaxial acceleration sensor 39 in a moving state of the triaxial acceleration sensor 39 is given as measured values of acceleration components (Ax [G], Ay [G], Az [G]) obtained by decomposing a synthetic vector of external force and gravity into the coordinates (Xs, Ys, Zr) of the three axes of the acceleration sensor 39.

Assume now that (Nx, Ny, Nz) are components obtained by decomposing external force N into the coordinates (Xs, Ys, Zs) of the three axes of the acceleration sensor 39. The specifications for the triaxial acceleration sensor 39 are defined so that acceleration components of dynamic acceleration output from the triaxial acceleration sensor 39 can be given as follows in consideration of the respective components of the external force N.

$$Ax = Nx + g \times \sin \alpha \, [G]$$

$$Ay = Ny + g \times \sin \beta \, [G]$$

$$Az = Nz + g \times \cos \theta \, [G]$$

The specifications are defined so that synthetic acceleration A in a free fall state of the triaxial acceleration sensor 39 satisfies the following equation.

$$A = \sqrt{(Ax^2 + Ay^2 + Az^2)} = 0 \, [G]$$

Next, the relation between the rotation angle of the triaxial acceleration sensor 39 and an acceleration value output from the triaxial acceleration sensor 39 will be described in the case where the triaxial acceleration sensor 39 is rotated on a specific axis.

Figure 4:
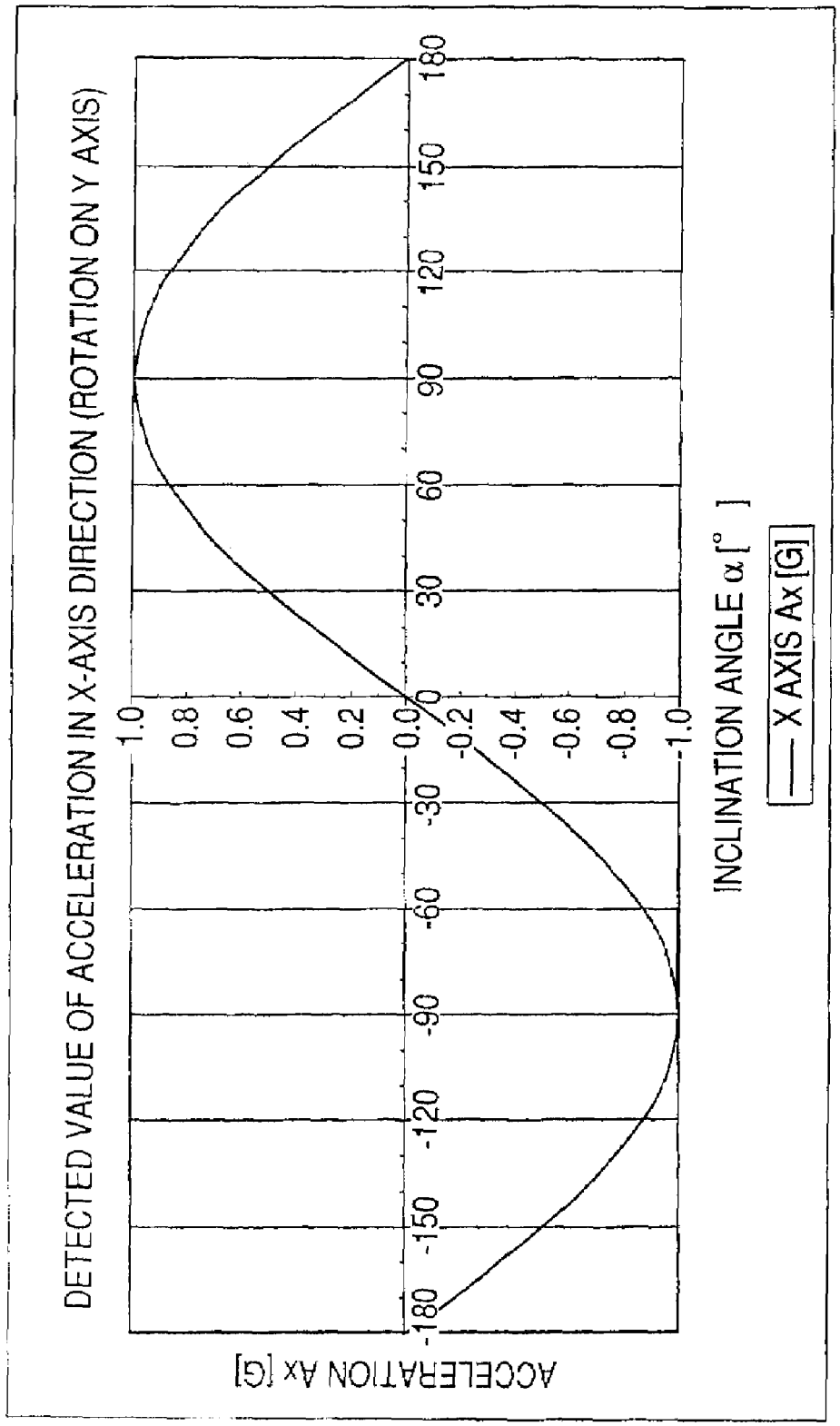
FIG. 4 is a graph showing the relation between the rotation angle of the triaxial acceleration sensor and the static acceleration value output in the X-axis direction from the triaxial acceleration sensor in the case where the triaxial acceleration sensor is rotated by 180° on the Y axis.

FIG. 4 is a graph showing the relation between the rotation angle of the triaxial acceleration sensor 39 and a static acceleration value output in the X-axis direction from the triaxial acceleration sensor 39 when the triaxial acceleration sensor 39 is rotated by ±180° on the Y axis.

An equation expressing the relation between the rotation angle of the triaxial acceleration sensor 39 on the Y axis and the static acceleration value output in the X-axis direction from the triaxial acceleration sensor 39 will be described below with reference to FIG. 3.

First, the coordinate axes (Xs, Ys, Zs) of the triaxial acceleration sensor 39 are made coincident with the space coordinate axes (X, Y, Z). In this case, the rotation angle α is equal to 0°.

Then, the rotation angle α is changed in a numerical value width of ±90°. When the horizontal axis of the graph expresses rotation angle α [°] and the vertical axis expresses static acceleration Ax [G], the rotation angle of the triaxial acceleration sensor 39 on the Y axis and the static acceleration value output in the X-axis direction from the triaxial acceleration sensor 39 satisfy the following relational equation.

$$Ax = g \times \sin \alpha \, [G] \, (g = 1 \, [G] \text{ in FIG. 4})$$

Next, the relation between a constant acceleration variation ΔAx in the static acceleration Ax [G] output in the X-axis direction from the triaxial acceleration sensor 39 and an inclination angle variation Δα necessary for generating the constant acceleration variation ΔAx will be described.

Figure 5:
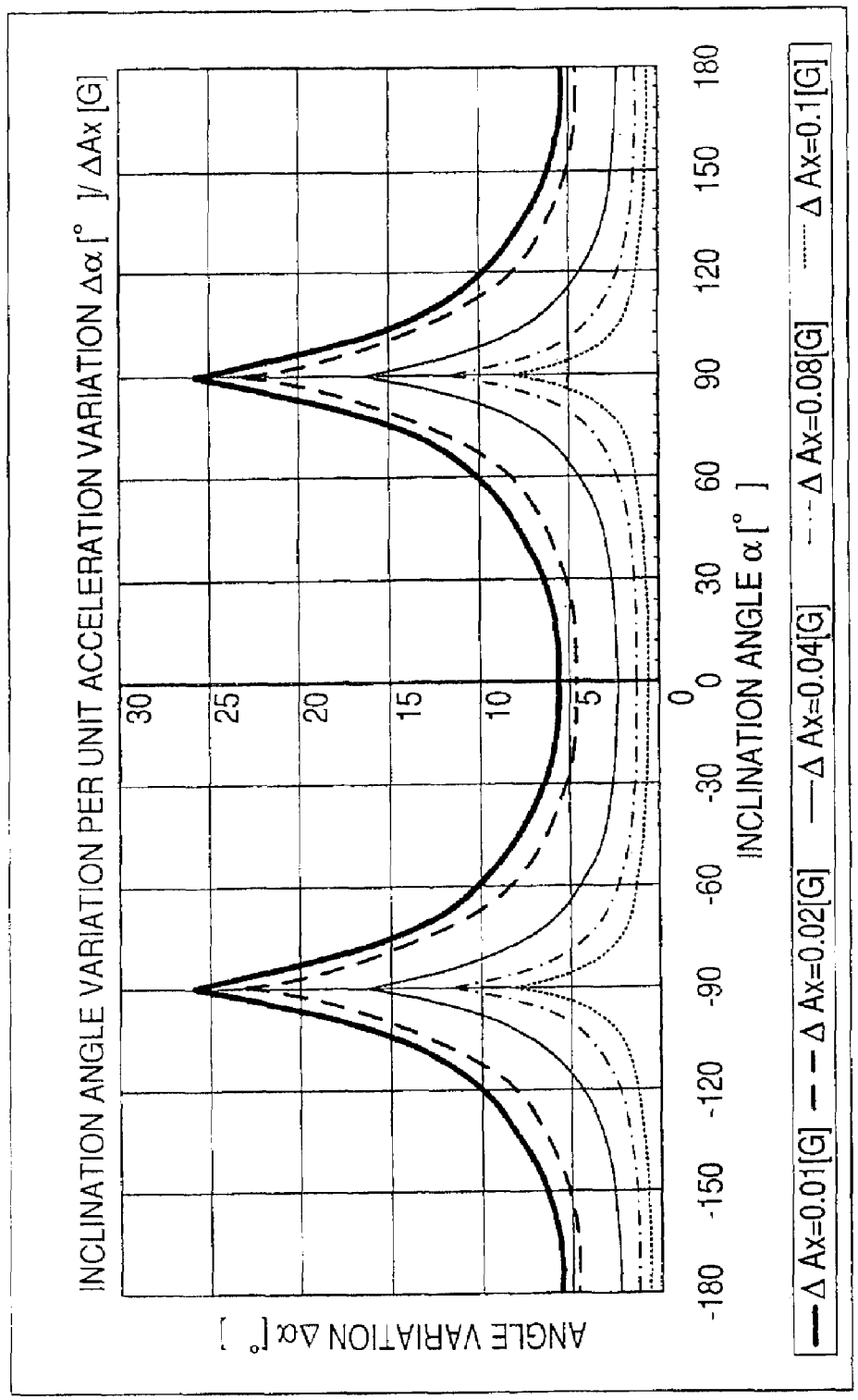
FIG. 5 is a graph showing the relation between a constant acceleration variation $\Delta Ax$ in the static acceleration $Ax$ [G] output in the X-axis direction from the triaxial acceleration sensor and an inclination angle variation $\Delta \alpha$ required for generating the constant acceleration variation $\Delta Ax$.
Figure 6:
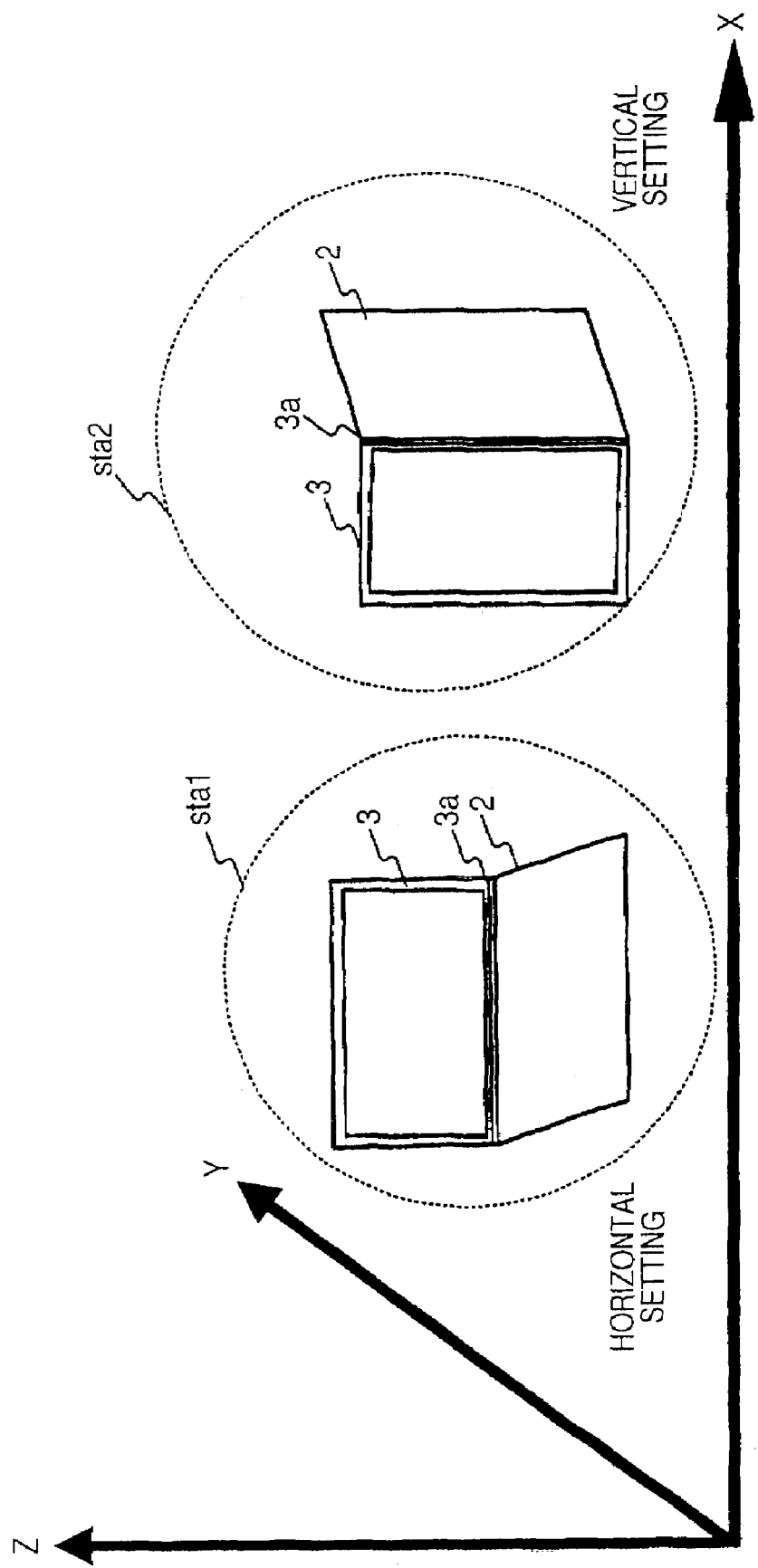
FIG. 6 is a view showing a state in which the computer is set horizontally and a state in which the computer is set vertically.

FIG. 5 is a graph showing the relation between a constant acceleration variation ΔAx in the static acceleration Ax [G] output in the X-axis direction from the triaxial acceleration sensor 39 and an inclination angle variation Δα necessary for generating the constant acceleration variation ΔAx. FIG. 6 is a view showing a state in which the computer 1 is set horizontally and a state in which the computer 1 is set vertically.

Referring to the graph of FIG. 5, for example, it can be said that the inclination angle variation Δα necessary for generating the X-axis static acceleration variation ΔAx=0.04 [G] has the following relation.

Horizontal Setting: α (inclination angle)=0°, Δα (inclination angle variation)=2.3°

45° inclination setting: α=±45°, Δα=3.2°

Vertical setting: α=±90°, Δα=16.3°

The term "horizontal setting" means the state of the computer 1 encircled by a broken-line circle still shown in FIG. 6, that is, the state of the computer 1 in which a hinge 3a is parallel to the X-Y plane.

The term "vertical setting" means the state of the computer 1 encircled by a broken-line circle sta2 shown in FIG. 6, that is, the state of the computer 1 in which the hinge 3a is vertical to the X-Y plane.

By referring to the aforementioned relation between the inclination angle α and the inclination angle variation Δα, static acceleration output characteristic in the X-axis direction can be evaluated so that the inclination angle variation Δα required for generating the static acceleration variation ΔAx=0.04 [G] in the X-axis direction in an inclination angle α range of from −45° to 45° takes a value of 2.3° to 3.2°. That is, it can be evaluated so that the value of the inclination angle variation Δα required for generating the static acceleration variation ΔAx=0.04 [G] in the X-axis direction in an inclination angle α range of from −45° to 45° is kept approximately constant.

On the other hand, it can be evaluated so that the inclination angle variation Δα required for generating the static acceleration variation ΔAx=0.04 [G] in the X-axis direction takes a larger value (e.g. inclination angle variation Δα=16.3° in the case of inclination angle α+±90°), for example, compared with the inclination angle variation Δα=3.2° in the case of the inclination angle α=±45° as the inclination angle approaches ±90°.

As will be described later in detail, the EC/KBC 28 detects the X-axis acceleration sensor output at intervals of a constant sampling period T [s] when the HDD protection function is on. The EC/KBC 28 predicts generation of impact applied on the HDD 21 by using the detected acceleration sensor output value. The term "prediction of generation of impact" means that "the EC/KBC 28 predicts the possibility that impact will be applied on the built-in HDD 21 of the computer 1 because of fluctuation of the computer 1" when the acceleration variation ΔAx in the sampling period T [s] exceeds a predetermined threshold.

When, for example, the predetermined threshold is set to be 0.04 [G], detecting characteristic for fluctuation in the X-axis direction can be evaluated as the following characteristic.

(1) When an X-axis acceleration variation corresponding to an angle variation of 2° to 3° approximately is generated in a sampling period in the case where the inclination angle α is in a range of from −45° to 45°, the EC/KBC 28 predicts "the possibility that impact will be generated".

(2) When an X-axis acceleration variation corresponding to an angle variation of 16° approximately is generated in a sampling period as the inclination angle α approaches 90°, the EC/KBC 28 predicts "the possibility that impact will be generated".

Incidentally, the relation between the acceleration value Ay [G] and acceleration variation ΔAy [G] output in the Y-axis direction from the triaxial acceleration sensor 39 and the inclination angle β [°] of the triaxial acceleration sensor 39 in the case where the triaxial acceleration sensor 39 is rotated by ±180° on the X-axis direction can be evaluated in the same manner as in the aforementioned case where the triaxial acceleration sensor 39 is rotated by ±180° on the Y-axis direction According to the evaluation, it can be said that characteristic of two axial components (X and Y) is as follows.

(a) When the computer 1 is set approximately horizontally (with an inclination angle of −45° to +45°), the sensitivity for detection of fluctuation of the computer 1 is very high.

(b) As the computer 1 is set unstably vertically (with an inclination angle of ±90°), the sensitivity for detection of fluctuation of the computer 1 becomes very low.

Next, the relation between the constant acceleration variation ΔAz with respect to the static acceleration Az [G] output in the Z-axis direction from the triaxial acceleration sensor 39 and the inclination angle variation Δθ required for generating the constant acceleration variation ΔAz will be described.

Figure 7:
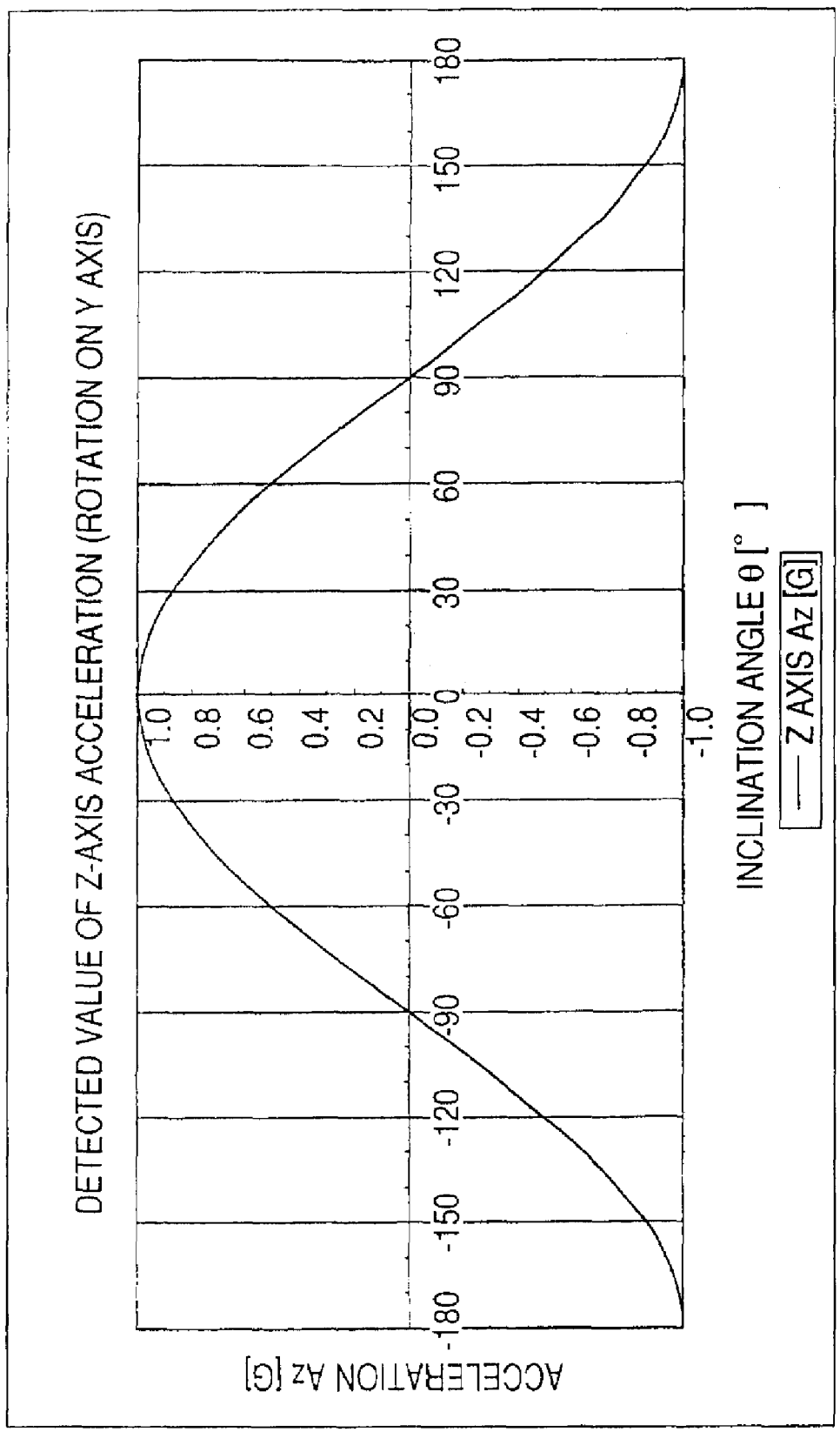
FIG. 7 is a graph showing the relation between the rotation angle of the triaxial acceleration sensor and the static acceleration value output in the Z-axis direction from the triaxial acceleration sensor in the case where the triaxial acceleration sensor is rotated by 180° on the Y axis.

FIG. 7 is a graph showing the relation between the rotation angle of the triaxial acceleration sensor 39 and the static acceleration value output in the Z-axis direction from the triaxial acceleration sensor 39 when the triaxial acceleration sensor 39 is rotated by ±180° on the Y-axis.

First, coordinate axes (Xs, Ys, Zs) of the triaxial acceleration sensor 39 are made coincident with the space coordinate axes (X, Y, Z). In this case, the rotation angle θ is equal to 0°.

Then, the rotation angle θ is changed in a numerical value width of ±90°. When the horizontal axis of the graph expresses rotation angle θ [°] and the vertical axis expresses static acceleration Az [G], the rotation angle of the triaxial acceleration sensor 39 on the Y axis and the static acceleration value output in the Z-axis direction from the triaxial acceleration sensor 39 satisfy the following relational equation.

$$Az = g \times \cos\theta \,[G](g=1\,[G]\text{ in FIG. 7})$$

Next, the relation between a constant acceleration variation ΔAz in the static acceleration Az [G] output in the Z-axis direction from the triaxial acceleration sensor 39 and an inclination angle variation Δθ necessary for generating the constant acceleration variation ΔAz will be described.

Figure 8:
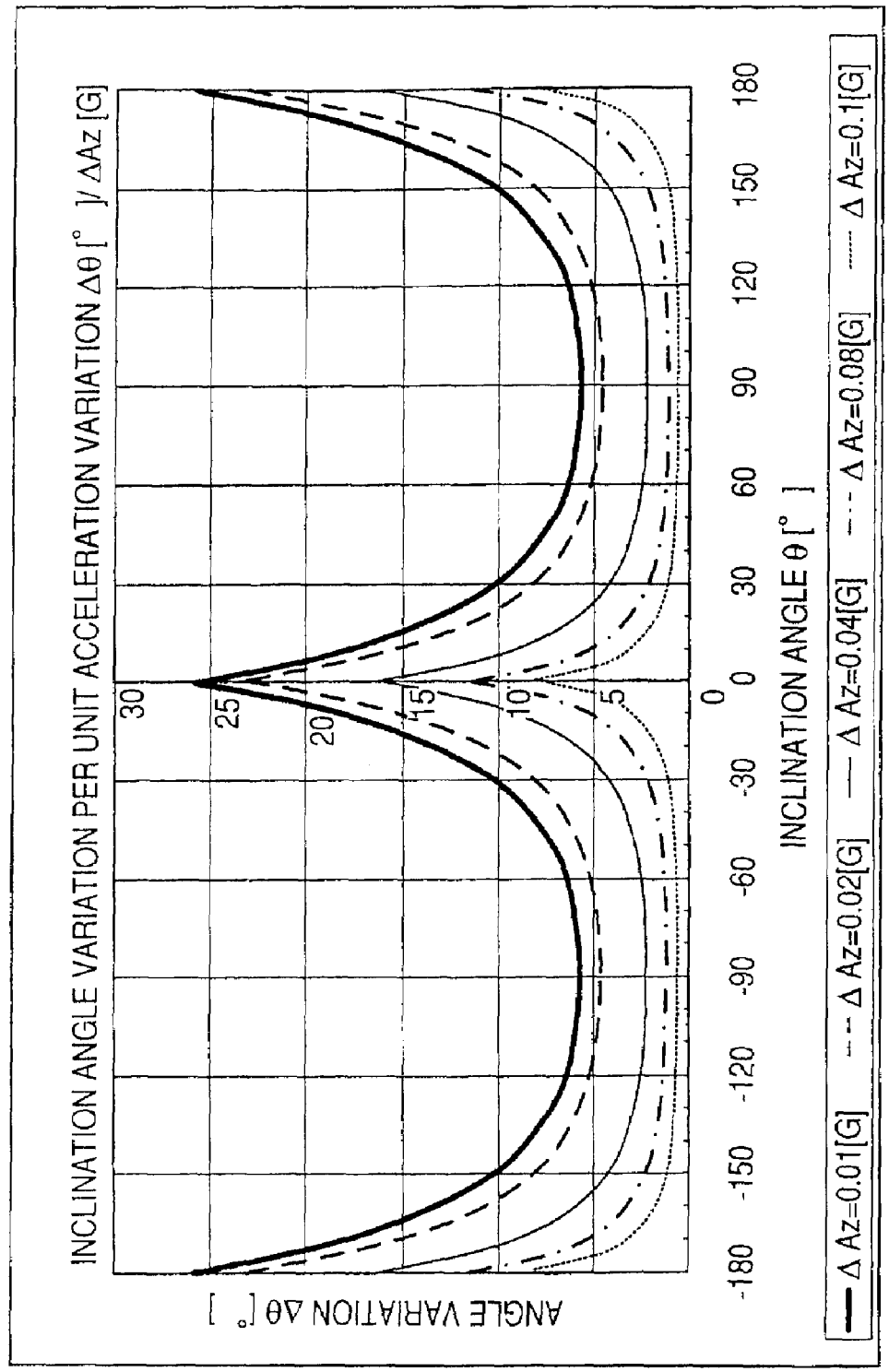
FIG. 8 is a graph showing the relation between a constant acceleration variation $\Delta Az$ in the static acceleration $Az$ [G] output in the Z-axis direction from the triaxial acceleration sensor and an inclination angle variation $\Delta \theta$ required for generating the constant acceleration variation $\Delta Az$.

FIG. 8 is a graph showing the relation between a constant acceleration variation ΔAz in the static acceleration Az [G] output in the Z-axis direction from the triaxial acceleration sensor 39 and an inclination angle variation Δθ necessary for generating the constant acceleration variation ΔAz.

Referring to the graph of FIG. 8, for example, it can be said that the inclination angle variation Δθ necessary for generating the Z-axis static acceleration variation ΔAz=0.04 [G] has the following relation.

Horizontal Setting: θ (inclination angle)=0°, Δθ (inclination angle variation)=16.3°

45° inclination setting: θ=±45°, Δθ=3.2° vertical setting: θ=±90°, Δθ=2.3°

By referring to the aforementioned relation between the inclination angle θ and the inclination angle variation Δθ, static acceleration output characteristic in the Z-axis direction can be evaluated so that the inclination angle variation Δθ required for generating the Z-axis static acceleration variation ΔAz=0.04 [G] in an inclination angle θ range of from −90° to −45° and from 45° to 90° takes a value of 2.3° to 3.2°. That is, it can be evaluated so that the value of the inclination angle variation Δθ required for generating the Z-axis static acceleration variation ΔAz=0.04 [G] in an inclination angle θ range of from −90° to −45° and from 45° to 90° is kept approximately constant.

On the other hand, it can be evaluated so that the inclination angle variation Δθ required for generating the Z-axis static acceleration variation ΔAz=0.04 [G] takes a larger value (e.g. inclination angle variation Δθ=16.3° in the case of inclination angle θ=±0°), for example, compared with the inclination angle variation Δθ=3.2° in the case of the inclination angle θ=±45° as the inclination angle θ approaches ±0°.

As will be described later in detail, the EC/KBC 28 detects the Z-axis acceleration sensor output at intervals of a constant sampling period T [s]. The EC/KBC 28 predicts generation of impact applied on the HDD 21 by using the detected acceleration sensor output value. The term "prediction of generation of impact" means that "the EC/KBC 28 predicts the possibility that impact will be applied on the built-in HDD 21 of the computer 1 because of fluctuation of the computer 1" when the acceleration variation ΔAz in the sampling period T [S] exceeds a predetermined threshold.

When, for example, the predetermined threshold is set to be 0.04 [G], detecting characteristic for fluctuation in the Z-axis direction can be evaluated as the following characteristic.

(3) When a Z-axis acceleration variation corresponding to an angle variation of 2° to 3° approximately is generated in a sampling period in the case where the inclination angle θ is in a range of from −90° to −45° and 45° to 90°, the EC/KBC 28 predicts "the possibility that impact will be generated".

(4) When a Z-axis acceleration variation corresponding to an angle variation of 16° approximately is generated in a sampling period as the inclination angle θ approaches 0°, the EC/KBC 28 predicts "the possibility that impact will be generated".

According to the evaluations (3) and (4), it can be said that characteristic of the Z-axis component is as follows.

(c) When the computer 1 is set approximately horizontally (with an inclination angle of 0°), the sensitivity for detection of fluctuation of the computer 1 is very low.

(d) As the computer 1 is set unstably vertically (with an inclination angle of −90° to −45° and 45° to 90°), the sensitivity for detection of fluctuation of the computer 1 becomes very high.

Use of the characteristics (c) and (d) of the Z-axis component makes the following facts possible.

(A) It is possible to prevent detection error in prediction of generation of impact for weak fluctuation generated when a computer 1 is used in a state in which the computer 1 is set relatively horizontally.

(B) Weak fluctuation generated when a computer 1 is used in a state in which the computer 1 is set relatively vertically can be predicted as fluctuation having the possibility that impact will be generated. Next, the HDD protection function will be described in brief.

Figure 9:
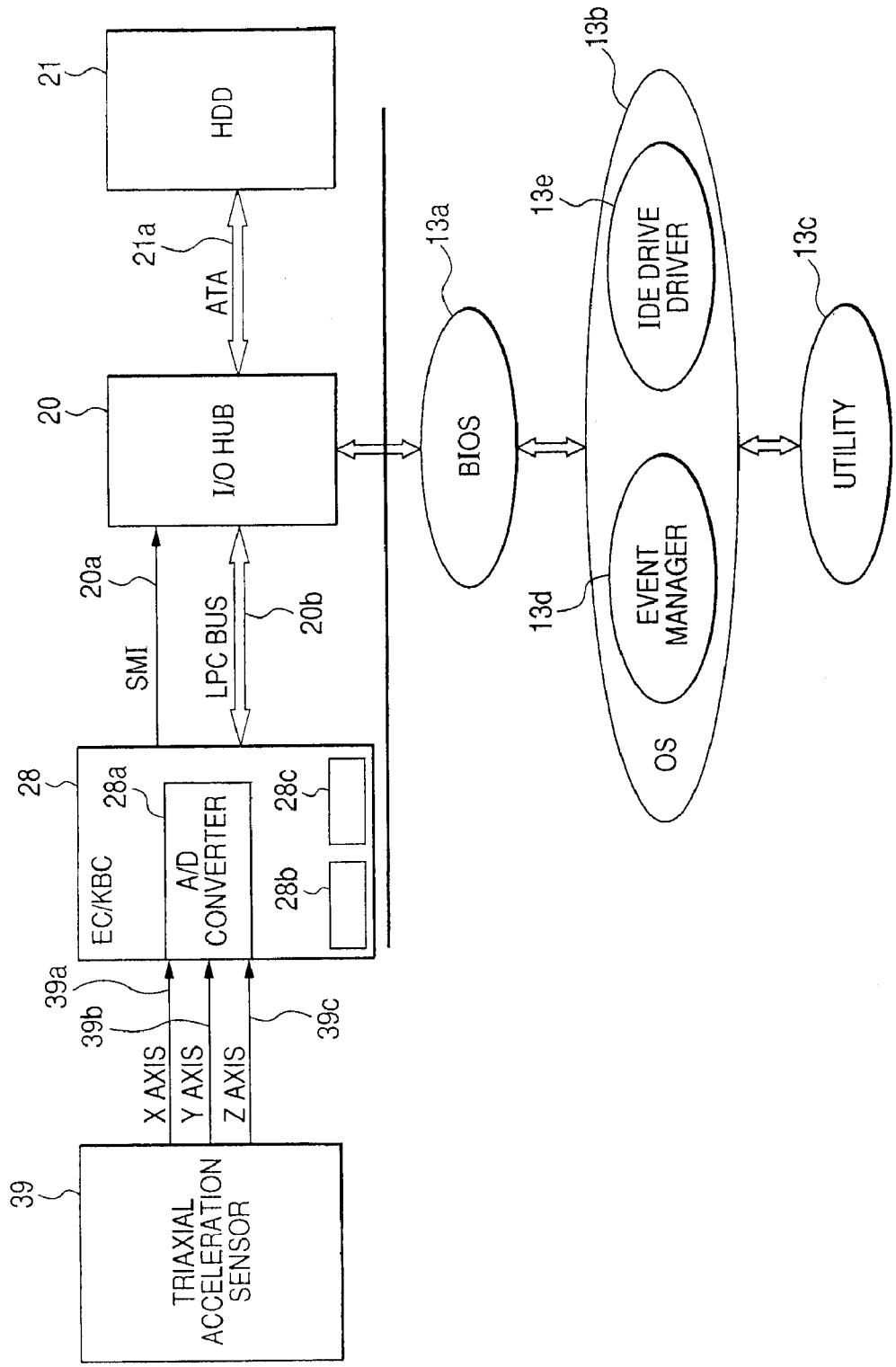
FIG. 9 is a schematic diagram for explaining an HDD protection function.
Figure 10:
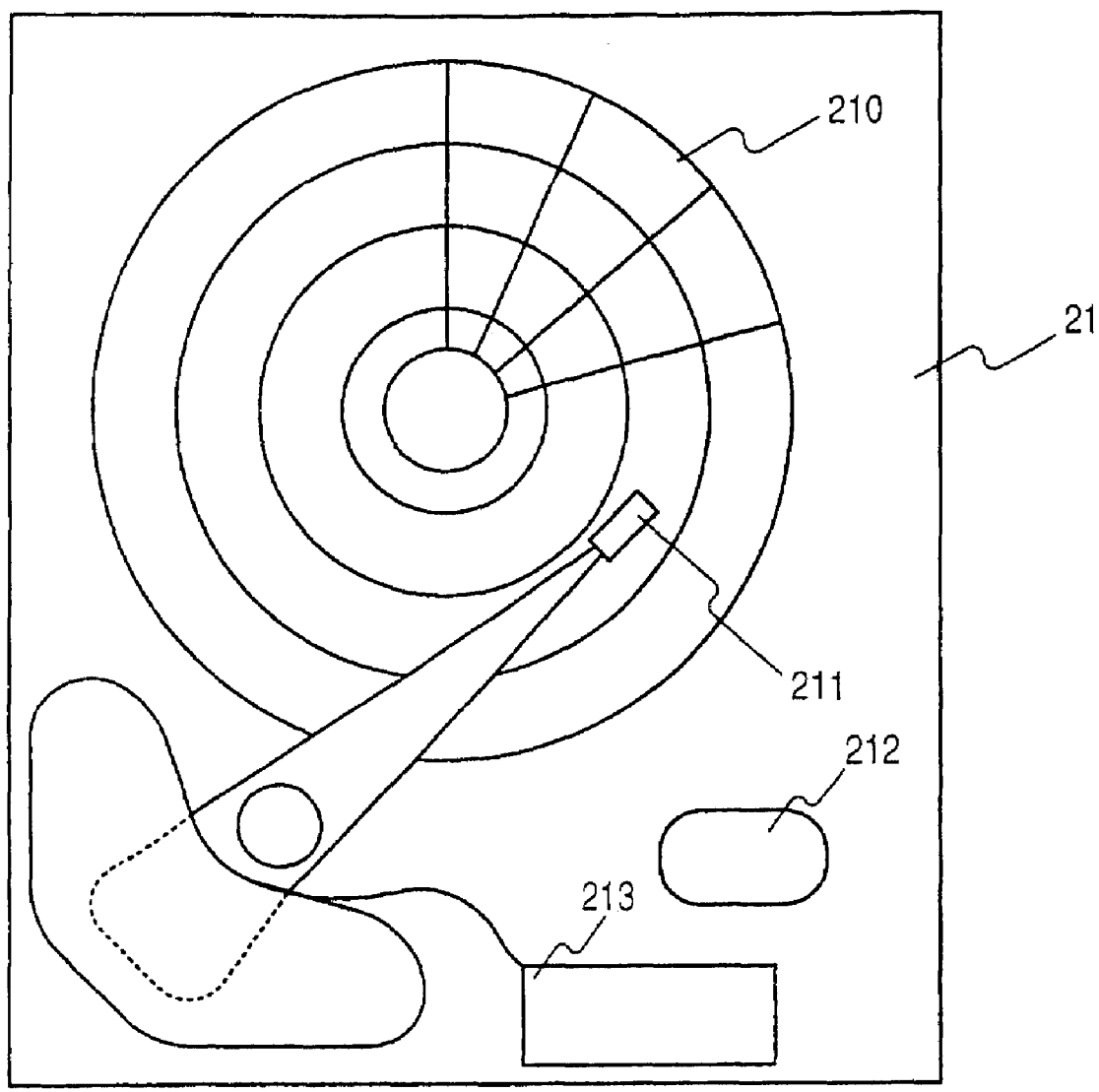
FIG. 10 is a view showing an example of hardware configuration of an HDD.

FIG. 9 is a schematic view for explaining the HDD protection function. FIG. 10 is a view showing an example of hardware configuration of the HDD 21.

The triaxial acceleration sensor 39 detects triaxial (X, Y, Z) acceleration values. The triaxial acceleration sensor 39 sends the detected triaxial (X, Y, Z) acceleration values as analog voltage values to the EC/KBC 28 through signal lines 39a, 39b and 39c respectively.

An A/D converter 28a built in the EC/KBC 28 converts the triaxial (X, Y, Z) acceleration values received from the triaxial acceleration sensor 39 into digital values.

The EC/KBC 28 measures triaxial (X, Y, Z) acceleration values at intervals of a constant sampling period T [s]. The EC/KBC 28 judges, on the basis of the measured acceleration values, "whether or not fluctuation having the possibility that impact will be applied on the built-in HDD 21 of the computer 1 occurs in the computer 1" or "whether or not the computer 1 is free from fluctuation having the possibility that impact will be applied on the built-in HDD 21 of the computer 1" at intervals of a constant period.

The EC/KBC 28's judgment as to "whether or not fluctuation having the possibility that impact will be applied on the built-in HDD 21 of the computer 1 occurs in the computer 1" is referred to as "prediction of generation of impact". The EC/KBC 28's judgment as to "whether or not the computer 1 is free from fluctuation having the possibility that impact will be applied on the built-in HDD 21 of the computer 1" is referred to as "prediction of static state".

When the EC/KBC 28 predicts generation of impact, a bit in a register 28b provided in the EC/KBC 28 is set in accordance with a result of the "prediction of generation of impact". The fact that a bit is set in the register 28b as a result of the S "prediction of generation of impact" means the fact that the computer 1 predicts that "impact will be generated in the HDD 21".

On the other hand, when the EC/KBC 28 predicts static state, the bit set in the register 28b provided in the SC/KBC 28 is reset in accordance with a result of the "prediction of static state". The fact that the bit is reset in the register 28b as a result of the "prediction of static state" means the fact that "fluctuation having the possibility of impact applied on the HDD 21 does not occur in the computer 1".

When the state of the register 28b in the EC/KBC 28 is changed, the EC/KBC 28 sends an SMI (System Management Interrupt) signal to the I/O hub 20. The BIOS 13a executed by the CPU 10 executes an SMI (System Management Interrupt) process. The BIOS 13a reads the register 28b in the EC/KBC 28 through an LPC bus 20b by executing the SMI process.

The BIOS 13a sends the read contents of the register 28b to a utility 13c operating on the OS 13b through an event manager 13d. The utility 13c is a software used for performing setting etc. necessary for implementing the HDD protection function. The function of the utility 13c will be described later in detail.

When the read contents of the register 28b indicate "prediction of generation of impact", the BIOS 13a sends a "request for execution of HDD 21 head retraction" as an event to the event manager 13d.

Upon reception of the "request for execution of HDD 21 head retraction", the event manager 13d performs control to prevent commands (e.g. data write process for the HDD 21) managed by an HDD file system from being output.

Upon reception of the "request for execution of HDD 21 head retraction", the event manager 13d further outputs a command of a head 211 high-speed retraction process (Unload Immediate Command) to an IDE drive driver 13e. The Unload Immediate Command is a command for temporarily interrupting a data read/write process between a cache 213 and a disk 210, for example, by every track and retracting the head 211 to a ramp 212. When the command of the head high-speed retraction process (unload immediate Command) is used, data in the cache 213 of the HDD 21 can be prevented from being lost even in the case where the head 211 is temporarily retracted to the ramp 212 in the middle of read/write.

The IDE drive driver 13e receives the command of the head high-speed retraction process and temporarily retracts the head 211 to the ramp 212.

On the other hand, when the read contents of the register 28b indicate "prediction of static state", the BIOS 13a sends an "HDD 21 head retraction cancel request" as an event to the event manager 13d of the OS 13b.

Upon reception of the "HDD 21 head retraction cancel request", the event manager 13d performs control so that commands (e.g. data write process for the HDD 21) managed by the HDD file system are output.

Upon reception of the "HDD 21 head retraction cancel request", for example, the event manager 13d further outputs a read command to the IDE drive driver 13e. Upon reception of the read command, the IDE drive driver 13e restarts a process just before retraction of the head 211. Next, an example of a control flow for achieving the HDD protection function will be described.

Figure 11:
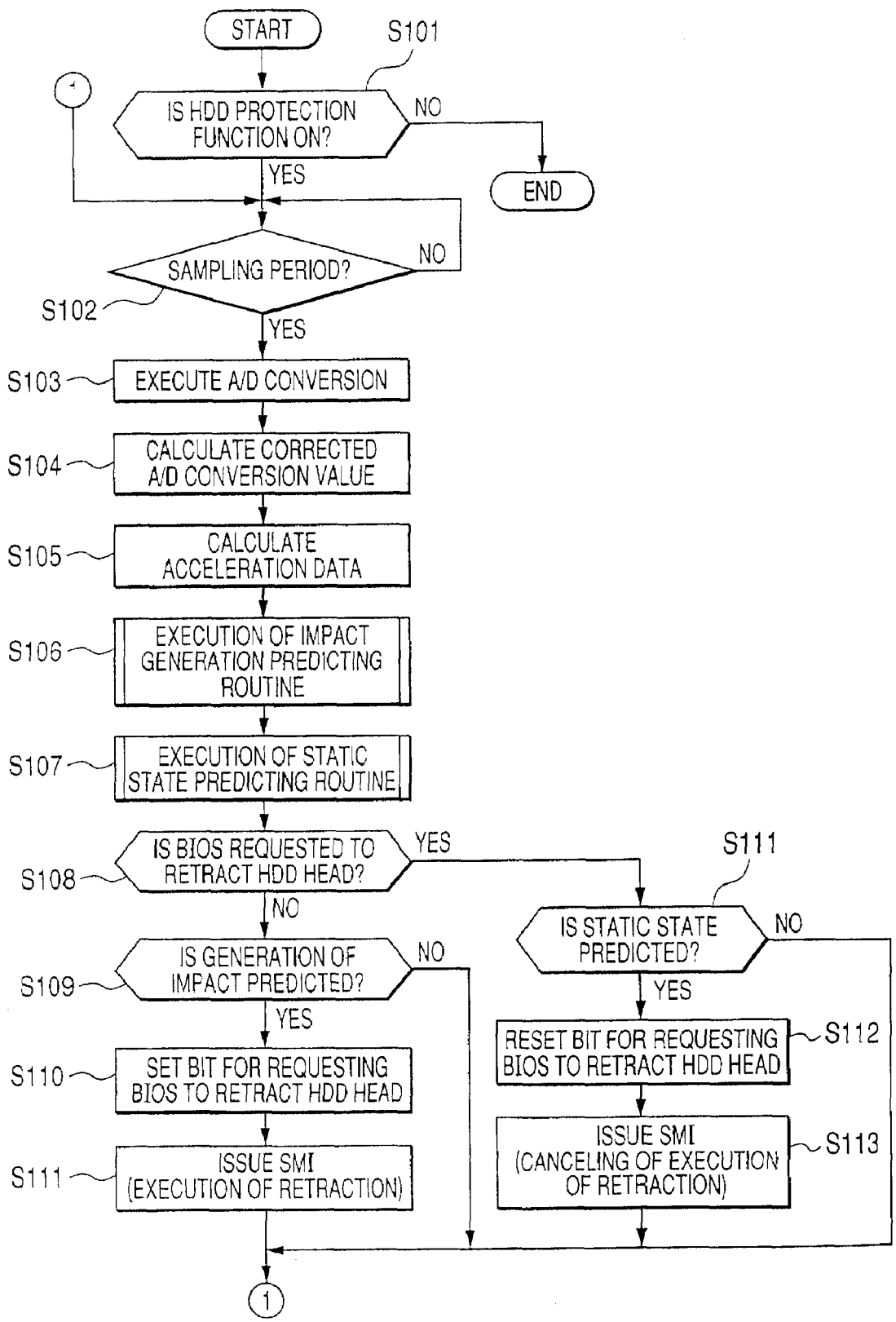
FIG. 11 is a flow chart for explaining an example of the control flow executed by the EC/KBC for achieving the HDD protection function.

FIG. 11 is a flow chart for explaining an example of a control flow executed in the EC/KBC for achieving the HDD protection function.

The EC/KBC 28 reads the register 28c and judges whether the HDD protection function is on or not (step S101). The register 28c will be described later.

When the HDD protection function is on (Yes in the step S101) and it is the sampling period (Yes in step S102), the A/D converter 28a built in the EC/KBC 28 converts the triaxial (X, Y, Z) acceleration values output from the triaxial acceleration sensor 39 into digital values and detects the triaxial (X, Y, Z) acceleration values as voltage values (step S103).

On the other hand, when the HDD protection function is off (No in the step S101), this control flow is terminated.

Generally, the output values of the triaxial acceleration sensor 39 have characteristic values defined by 0G-offset voltage values [V] and sensitivities [V/G]. The characteristic values of the triaxial acceleration sensor 39 have individual variations. To correct the variations, corrected values of 0G-off set voltages [V] and sensitivities [V/G] are stored, for example, in a nonvolatile memory, for example, in an inspection process before shipping of the computer 1.

The EC/KBC 28 corrects the voltage values detected by the A/D converter 28a by using the corrected values of 0G-offset voltages [V] and sensitivities [V/G] (step S104). The EC/KBC 28 calculates acceleration values, acceleration variations and a synthetic acceleration value (see FIGS. 3, 5, 7, etc.) by using the corrected voltage values (step S105).

The EC/KBC 28 executes a routine of predicting occurrence of impact by using the values calculated in the step S105 (step S106). The contents of processing executed by the routine of predicting occurrence of impact will be described later in detail.

The EC/KBC 28 further executes a routine of predicting static state by using the values calculated in the step S105 (step S107).

After the routine of predicting occurrence of impact and the routine of predicting static state are executed, a bit "1" set in the register 28b is read to thereby confirm the state in which "the BIOS is requested to retract the head of the HDD 21" (step S108). (The register 28b is read to thereby check whether "the BIOS is requested to retract the head of the HDD 21 or not").

When the BIOS is not requested to retract the head of the HDD 21, that is, when the bit of the register 28b is zero (No in the step S108), a result of the impact occurrence predicting routine executed in the step S106 is referred to (step S109).

When the prediction that "impact will occur onto the HDD 21" is given (Yes in the step S109) as a result of execution of the impact occurrence predicting routine, a bit "1" is set in the register 28b provided in the EC/KBC 28 (to obtain the state that "the BIOS is requested to retract the head of the HDD 21") (step S110).

After the bit "1" is set in the register 28b, the EC/KBC 28 sends an SMI signal (execution of head retraction) to the I/O hub 20 (step S111).

On the other hand, when the BIOS is requested to retract the head of the HDD 21 (Yes in the step S108), a result of the static state predicting routine executed in the step S106 is referred to (step S111).

When the prediction that "the computer 1 is at a standstill" is given (Yes in the step S111) as a result of execution of the static state predicting routine, the register 28b provided in the EC/KBC 28 is reset (to obtain the state that "the BIOS is not requested to retract the head of the HDD 21") (step S112).

After the bit of the register 28b is reset, the EC/KBC 28 sends an SMI signal (cancel of execution of head retraction) to the I/O hub 20 (step S113). Next, the impact occurrence predicting routine will be described. First, the kind of fluctuation applied on the computer 1 and data concerned with acceleration used for judging the kind of fluctuation will be described.

FIG. 12 is a table showing the relation between the kind of fluctuation applied on the computer 1 and data required for judging the kind of fluctuation.

Five kinds of fluctuation "free fall", "fluctuation due to strong external force", "fluctuation with rotation on the Z axis", "fluctuation with rotation on the X axis" and "fluctuation with rotation on the Y axis" are defined as kinds of fluctuation applied on the computer 1.

The synthetic acceleration value is used for judging whether the kind of fluctuation applied on the computer 1 is "free fall" or not. The term "free fall" means action of gravity on the computer 1 to make the computer 1 fall. Here, the synthetic acceleration is acceleration synthesized from acceleration acting in the X-axis direction, acceleration acting in the Y-axis direction and acceleration acting in the Z-axis direction. The reason why the synthetic acceleration value is used for judging whether the kind of fluctuation is "free fall" is in that the free fall can be detected regardless of the posture of the computer 1 which falls in the gravitational direction.

The synthetic acceleration value is also used for judging whether the kind of fluctuation applied on the computer 1 is "fluctuation due to strong external force" or not. The term "fluctuation due to strong external force" means fluctuation caused by action of force such as user's force on the computer 1. The reason why the synthetic acceleration value is used for judging whether the kind of fluctuation is "fluctuation due to strong external force" is in that the "fluctuation due to strong external force" can be detected in all directions (X, Y, Z).

The value of acceleration acting in the Z-axis direction and the variation of acceleration acting in the Z-axis direction are used for judging whether the kind of fluctuation applied on the computer 1 is "fluctuation with rotation on the Z axis" or not. The value of acceleration acting in the X-axis direction and the variation of acceleration acting in the X-axis direction are used for judging whether the kind of fluctuation applied on the computer 1 is "fluctuation with rotation on the X axis" or not. The value of acceleration acting in the Y-axis direction and the variation of acceleration acting in the Y-axis direction are used for judging whether the kind of fluctuation applied on the computer 1 is "fluctuation with rotation on the Y axis" or not. Next, the impact occurrence predicting routine executed in the step S106 will be described.

Figure 13:
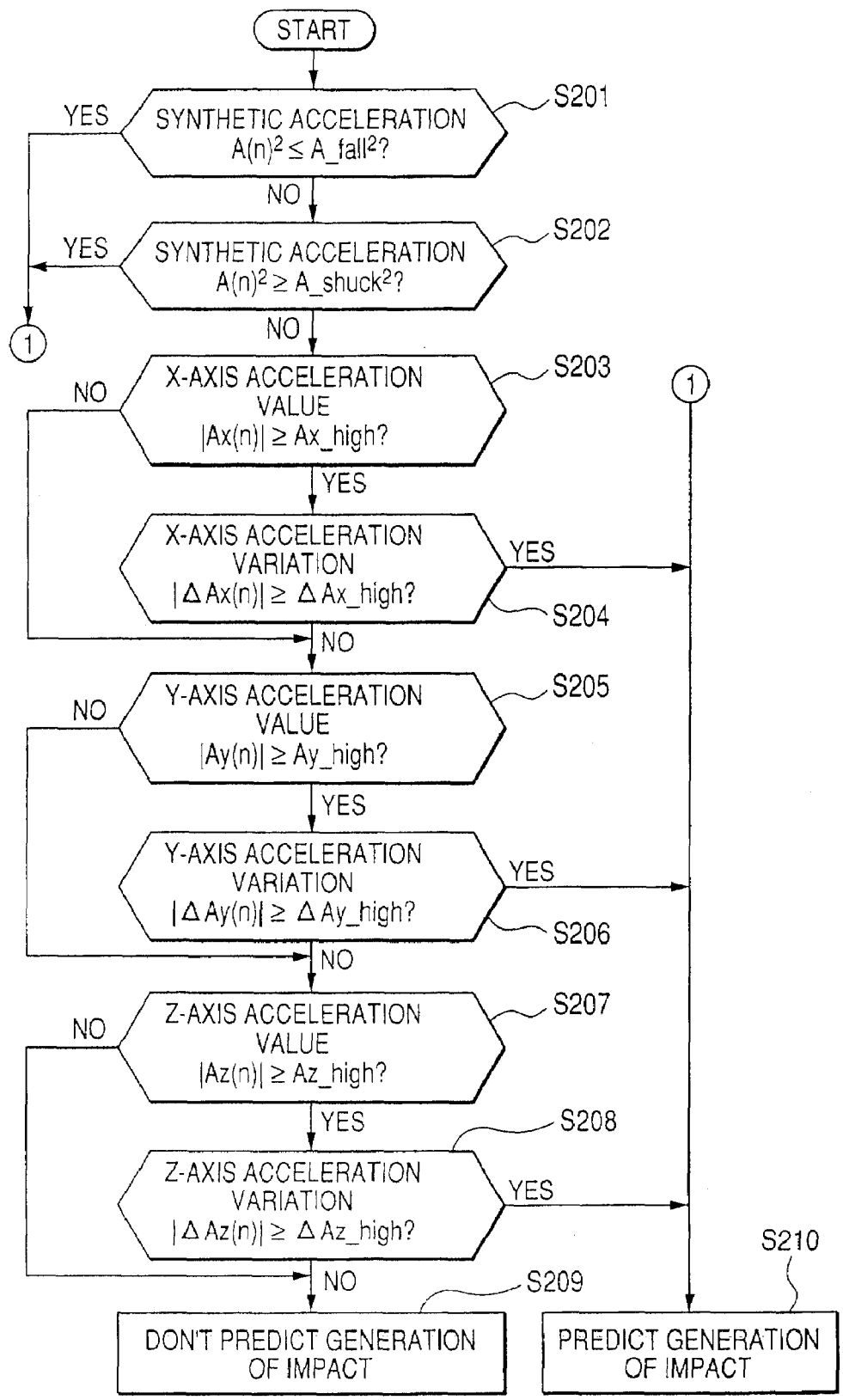
FIG. 13 is a flow chart for explaining an example of the routine for predicting occurrence of impact.

FIG. 13 is a flow chart for explaining an example of the impact occurrence predicting routine.

The EC/KBC 28 predicts occurrence of impact by using thresholds concerned with synthetic acceleration, acceleration and acceleration variations. A method for setting the thresholds in the EC/KBC will be described later in detail.

To predict occurrence of impact on the HDD 21, the EC/KBC 28 detects the five kinds of fluctuation "free fall", "application of strong force", "fluctuation with rotation on the X axis", "fluctuation with rotation on the Y-axis" and "fluctuation with rotation on the Z axis".

A threshold A_fall [G] for detecting the "free fall" and a threshold A_shuck [G] for detecting the "application of strong force" are used as thresholds of synthetic acceleration A(n). When the EC/KBC 28 makes a decision that "the value of synthetic acceleration A(n) is not larger than the threshold A_fall [G], that is, the computer 1 falls freely" (Yes in the step S201), the prediction that "impact will occur on the HDD 21" is given as the state of the computer 1 (step S210).

When the EC/KBC 28 makes a decision that "the value of synthetic acceleration A(n) is not larger than the threshold A_shuck [G], that is, strong force is applied on the computer 1" (Yes in the step S202), the prediction that "impact will occur on the HDD 21" is given as the state of the computer 1 (step S210).

For example, the threshold for detecting the free fall and the threshold for detecting the application of strong external force can be set as A_fall=0.5 [G] and A_shuck=1.5 [G].

A threshold Ax_high [G] for detecting the X-axis acceleration component value causing fluctuation having the possibility that impact will be applied on the HDD 21 and a threshold ΔAx_high [G] for detecting the X-axis acceleration variation value causing fluctuation having the possibility that impact will be applied on the HDD 21 are used as thresholds of the X-axis acceleration component. When the EC/KBC 28 makes a decision that "the value of the X-axis acceleration component |Ax(n)| is not smaller than the threshold Ax_high [G]" (Yes in the step S203) and makes a decision that "the value of the X-axis acceleration variation |ΔAx(n)| is not smaller than the threshold ΔAx_high [G]" (Yes in the step S204), the prediction that "impact will occur on the HDD 21" is given as the state of the computer 1 (step S210).

When, for example, ΔAx_high=0.04 [G] is set, occurrence of fluctuation causing the rotation of the computer 1 by about 2.3° on the X axis can be detected.

A threshold Ay_high [G] for detecting the Y-axis acceleration component value causing fluctuation having the possibility that impact will be applied on the HDD 21 and a threshold ΔAy_high [G] for detecting the Y-axis acceleration variation value causing fluctuation having the possibility that impact will be applied on the HDD 21 are used as thresholds of the Y-axis acceleration component. When the EC/KBC 28 makes a decision that "the value of the Y-axis acceleration component |Ay(n)| is not smaller than the threshold Ay_high [G]" (Yes in the step S205) and makes a decision that "the value of the Y-axis acceleration variation |ΔAy(n)| is not smaller than the threshold ΔAy_high [G]" (Yes in the step S206), the prediction that "impact will occur on the HDD 21" is given as the state of the computer 1 (step S210).

A threshold Az_high [G] for detecting the Z-axis acceleration component value causing fluctuation having the possibility that impact will be applied on the HDD 21 and a threshold ΔAz_high [G] for detecting the Z-axis acceleration variation value causing fluctuation having the possibility that impact will be applied on the HDD 21 are used as thresholds of the Z-axis acceleration component. When the EC/KBC 28 makes a decision that "the value of the Z-axis acceleration component |Az(n)| is not smaller than the threshold Az_high [G]" (Yes in the step S207) and makes a decision that "the value of the Z-axis acceleration variation |ΔAz(n)| is not smaller than the threshold ΔAz_high [G]" (Yes in the step S208), the prediction that "impact will occur on the HDD 21" is given as the state of the computer 1 (step S210).

On the other hand, when the EC/KBC 28 does not make a decision that "the value of the Z-axis acceleration variation |ΔAz(n)| is not smaller than the threshold ΔAz_high [G]" (No in the step S208), this concludes that no fluctuation having the possibility that impact will be applied on the HDD 21 is applied on the computer 1. Next, the relation between the kind of fluctuation applied on the computer 1 and the sensitivity level will be described.

FIG. 14 is a table for explaining an example of the relation between the kind of fluctuation applied on the computer 1 and the sensitivity level.

When acceleration applied on the computer 1 satisfies a predetermined condition, the computer 1 predicts that "impact will occur on the HDD 21". Referring to FIG. 8 for explaining the HDD protection function, the "judgment of occurrence of fluctuation on the computer 1 having the possibility that impact will be applied on the built-in HDD 21 of the computer 1" is defined as "prediction of occurrence of impact". Here, the "sensitivity level" is provided as a parameter for deciding the "allowed number of kinds of fluctuation to be considered for prediction of occurrence of impact".

For example, as shown in FIG. 14, "level 3", "level 2" and "level 1" are provided as sensitivity levels.

The sensitivity level "level 3" means that occurrence of impact is predicted when any one of the five kinds of fluctuation "free fall", "application of strong external force", "fluctuation with rotation on the Z axis", "fluctuation with rotation on the X axis" and "fluctuation with rotation on the Y axis" occurs on the computer 1. The sensitivity level "level 2" means that occurrence of impact is predicted when any one of the three kinds of fluctuation "free fall", "application of strong external force" and "fluctuation with rotation on the Z axis" occurs on the computer 1. The sensitivity level "level 1" means that occurrence of impact is predicted when either of the two kinds of fluctuation "free fall" and "application of strong external force" occurs on the computer 1.

For example, in comparison between the sensitivity levels "level 3" and "level 1" the sensitivity level "level 3" allows the five kinds of fluctuation as kinds of fluctuation to be considered at the time of predicting occurrence of impact whereas the sensitivity level "level 1" allows the two kinds of fluctuation as kinds of fluctuation to be considered at the time of predicting occurrence of impact. Accordingly, in comparison between the sensitivity levels "level 3" and "level 1", it can be said that the sensitivity level "level 3" is higher in sensitivity than the sensitivity level "level 1".

When, for example, the "fluctuation with rotation on the X axis" occurs, occurrence of impact is predicted in the sensitivity level "level 3" because the sensitivity level "level 3" allows the "fluctuation with rotation on the X axis" as a kind of fluctuation to be considered at the time of predicting occurrence of impact whereas occurrence of impact is not predicted in the sensitivity level "level 1" because the sensitivity level "level 1" does not allow the "fluctuation with rotation on the X axis" as a kind of fluctuation to be considered at the time of predicting occurrence of impact. That is, it can be said that the sensitivity level "level 3" in which occurrence of impact is predicted on the basis of the "fluctuation with rotation on the X axis" is higher in sensitivity than the sensitivity level "level 1" in which occurrence of impact is not predicted on the basis of the "fluctuation with rotation on the X axis". Next, selection of the sensitivity level in accordance with the scene of use of the computer 1 will be described.

FIG. 15 is a table for explaining an example of selection of the sensitivity level in accordance with the scene of use of the computer 1.

When the computer 1 is used in the condition that the computer 1 is settled on a desk while an AC adapter is connected to the computer 1, it is preferable that the sensitivity level is selected to be "level 3". That is, because it is conceived that fluctuation hardly occurs on the computer 1 when the computer 1 is used in the condition that the computer 1 is settled on a desk, it is preferable that "level 3" with the highest sensitivity is selected from the sensitivity levels described above with reference to FIG. 14. When the sensitivity level is selected to be "level 3" for the computer 1 which is used in the condition that the computer 1 is settled on a desk, the computer 1 goes to a state in which the prediction that "impact will occur on the HDD 21" is made in accordance with fluctuation which occurs on the computer 1 at the time of carrying the computer 1.

When the battery-driven computer 1 is used on a lap or in a car, it is preferable that the sensitivity level is selected to be "level 2". Because it is conceived that the "fluctuation with rotation on the X axis" and the "fluctuation with rotation on the Y axis" occur frequently when the Computer 1 is used on a lap or in a car, that is, when the computer 1 is used in an approximately horizontal state (see FIG. 6), the possibility that the state of the computer 1 will be kept in a state of prediction that "impact will occur on the HDD 21" becomes high if the sensitivity level is set so that occurrence of impact can be predicted in accordance with generation of the "fluctuation with rotation on the X axis" or the "fluctuation with rotation on the Y axis" when the computer 1 is used on a lap or in a car. It is therefore preferable that "level 2" is selected from the sensitivity levels described above with reference to FIG. 12.

When the computer 1 is used while inclined approximately vertically (see FIG. 6), it is preferable that the sensitivity level is selected to be "level 1". For example, the scene in which the computer 1 is held in one hand and carried while music is listened to may be conceived as the scene in which the computer 1 is used while inclined approximately vertically.

Because it is conceived that the "fluctuation with rotation on the X axis", the "fluctuation with rotation on the Y axis" and the "fluctuation with rotation on the Z axis" occur frequently when the computer 1 is used while inclined vertically, the possibility that the state of the computer 1 will be kept in a state of prediction that "impact will occur on the HDD 21" becomes high if the sensitivity level is set so that occurrence of impact can be predicted in accordance with generation of the "fluctuation with rotation on the X axis", the "fluctuation with rotation on the Y axis" and the "fluctuation with rotation on the Z axis" when the computer 1 is used while inclined vertically.

It is therefore preferable that "level 1" is selected from the sensitivity levels described above with reference to FIG. 14. Next, the on/off control of the HDD protection function after powering on the computer 1 will be described.

Figure 16:
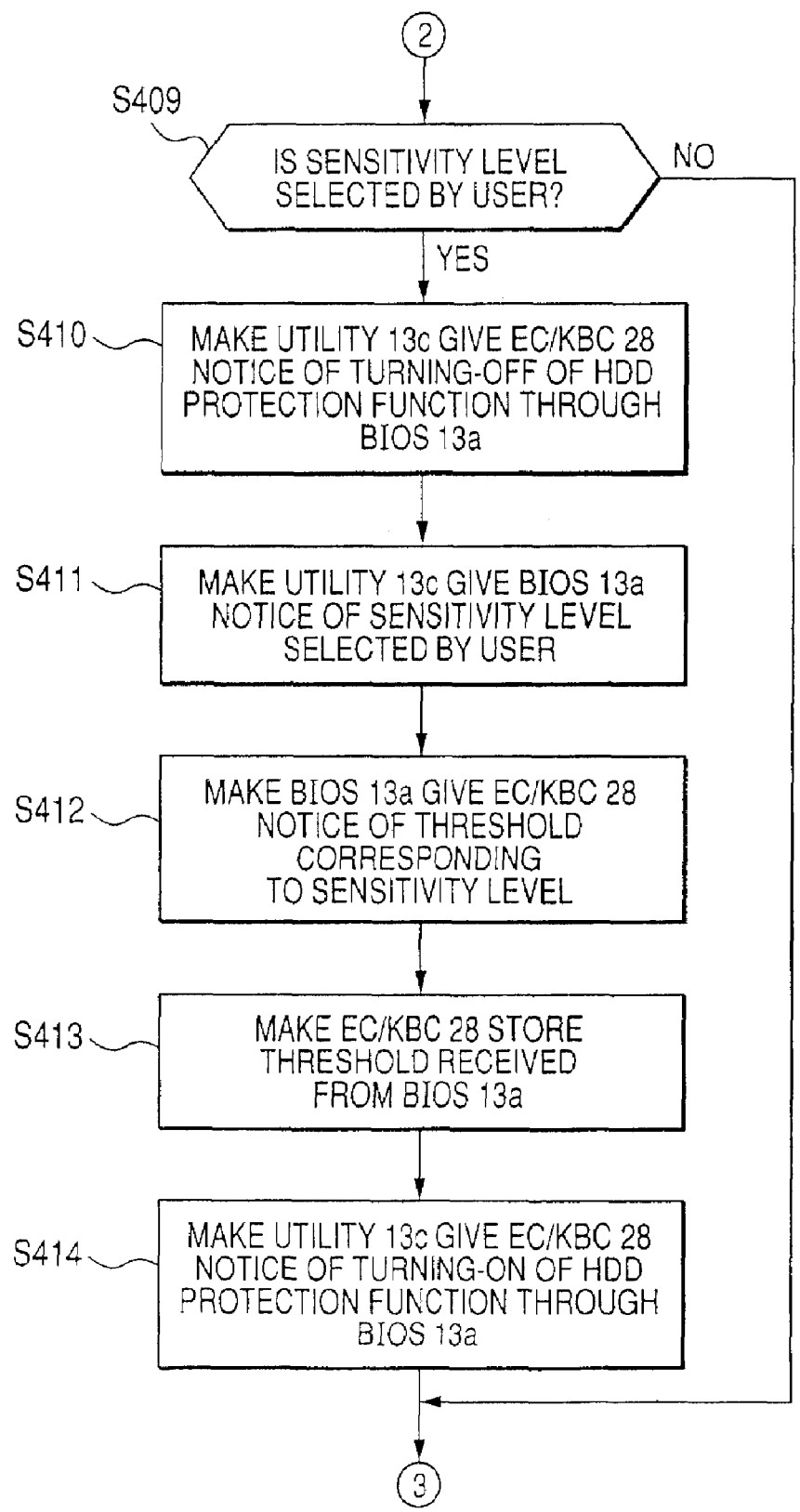
FIG. 16 is a first flow chart for explaining an example of the on/off control of the HDD protection function.
Figure 17:
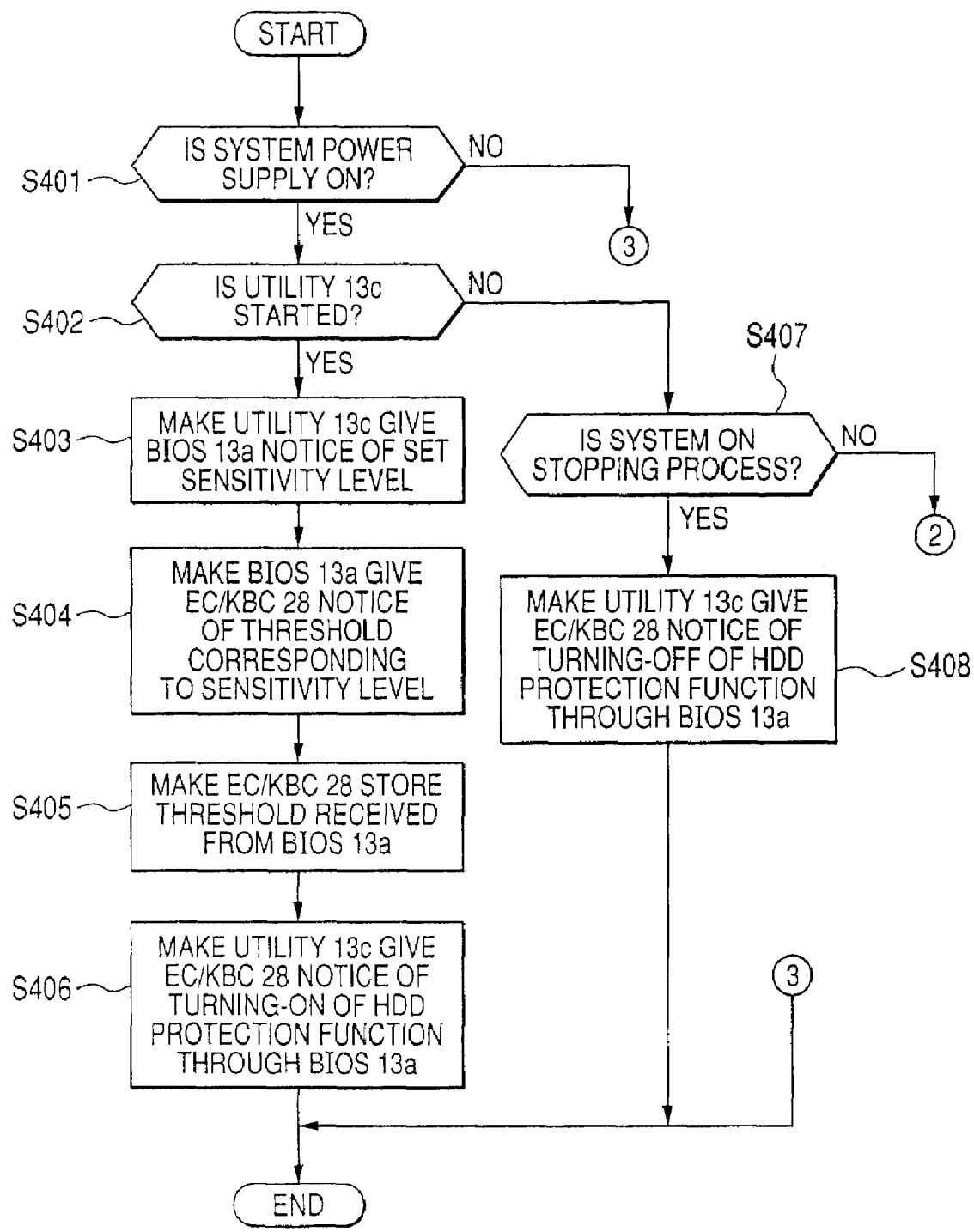
FIG. 17 is a second flow chart for explaining an example of the on/off control of the HDD protection function.
Figure 18:
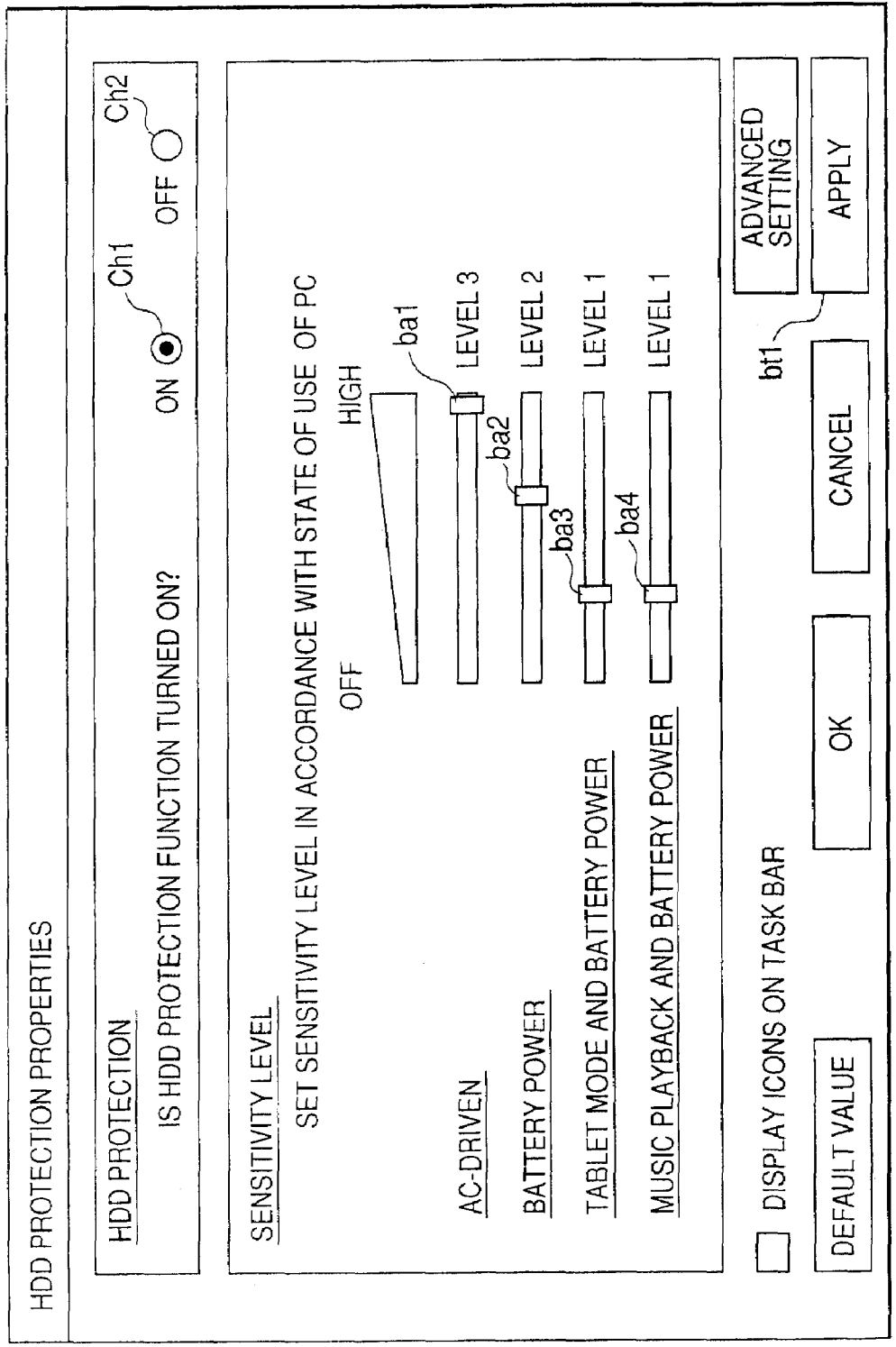
FIG. 18 is a view showing an example of the procedure for storing the thresholds of various kinds of acceleration from the utility into the EC/KBC through the BIOS.

FIG. 16 is a first flow chart for explaining an example of the on/off control of the HDD protection function. FIG. 17 is a second flow chart for explaining an example of the on/off control of the HDD protection function. FIG. 18 is a view showing an example of the procedure for making the utility 13c store various kinds of acceleration thresholds in the EC/KBC 28 through the BIOS 13a.

When the user operates the power button 6, the system of the computer 1 is powered on (Yes in step S401). When the system of the computer 1 is not powered on (No in the step S401), this control flow is terminated.

After the computer 1 is powered on, the BIOS 13a and the OS 13b are started. If the utility 13c begins to operate on the OS 13b (Yes in step S402) after the start of the OS 13b, the utility 13c which begins to operate on the OS 13b gives the BIOS 13a notice of the value of the sensitivity level (see FIG. 14) set in the utility 13c in advance. (step S403) (no1 in FIG. 21).

Figure 21:
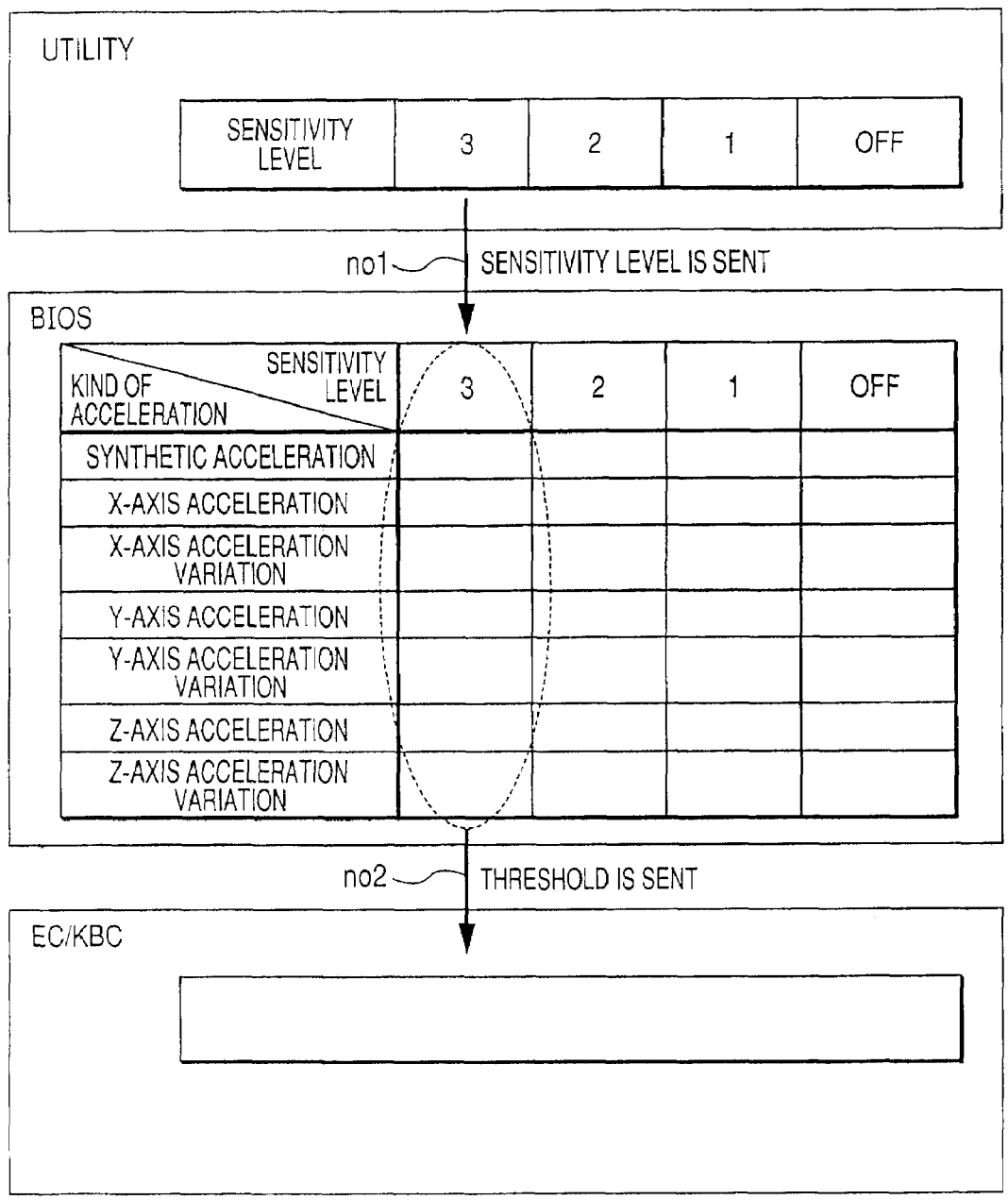
FIG. 21 is a view for explaining an example of the utility setting screen displayed for performing setting to temporarily increasing the sensitivity level of the computer.

The BIOS 13a gives the EC/KBC 28 notice of the thresholds concerned with various kinds of acceleration (see FIG. 14) in accordance with the value of the sensitivity level received from the utility 13c (step S404) (no2 in FIG. 21). Assume now that the BIOS 13a is configured to have the thresholds concerned with various kinds of acceleration in accordance with the value of the sensitivity level in advance.

The EC/KBC 28 stores the thresholds received from the BIOS 13a in a specific register (step S405). Further, the utility 13c sets the bit indicating "the on state of the HDD protection function" in the register 28c provided in the EC/KBC 28 to turn on the HDD protection function through the BIOS 13a (step S406).

If the stop process of the system of the computer 1 is being executed (Yes in step S407) in the condition that the is utility 13c has already operated on the OS 13b (No in the step S402) after the start of the OS 13b, the utility 13c resets the bit indicating "the on state of the HDD protection function" in the register 28c provided in the EC/KBC 28 to turn off the HDD protection function through the BIOS 13a (step S408).

On the other hand, if the user selects the sensitivity level by using the utility 13c (Yes in S409) in the condition that the stop process of the system of the computer 1 is not executed in the process of the step S407, that is, the utility 13c has already operated on the BIOS 13b (No in the step S407), the utility 13c resets the bit indicating "the on state of the HDD protection function" in the register 28c provided in the EC/KBC 28 to temporarily turn off the HDD protection function through the BIOS 13a (step S410), Then, the utility 13c informs the BIOS 13a of the selectivity level value selected by the user (step S411).

The BIOS 13a informs the EC/KBC 28 of the thresholds concerned with various kinds of acceleration corresponding to the sensitivity level value received from the utility 13c (step S412).

The EC/KBC 28 stores the thresholds concerned with various kinds of acceleration received from the BIOS 13a in a specific register (step S413). Further, the utility 13c sets the bit indicating "the on state of the HDD protection function" in the register 28c provided in the EC/KBC 28 to turn on the HDD protection function through the BIOS 13a (step S414). Next, an example of the utility 13c setting screen displayed for the user to set the sensitivity level, etc. will be described.

FIG. 18 is a view showing an example of the utility setting screen displayed for the user to set the sensitivity level, etc.

The user makes the LCD 4 display the setting screen shown in FIG. 18 to select the sensitivity level. When the user wants to turn off the HDD protection function, the user must check the check ch2. When the user wants to turn on the HDD protection function by default, the check ch1 is valid as default.

When the contents of settings change because the apply button bt1 is pushed down after the on/off of the HDD protection function is checked, the utility 13c informs the EC/KBC 28 of the on/off of the HDD protection function through the BIOS 13a.

Further, the user's selection of the sensitivity level in accordance with the case of use of the computer 1 will be described below. To set the sensitivity level in accordance with the case of use of the computer 1 to which the AC adapter is connected, the user can move the bar 1 to select the sensitivity level, for example, from "level 1", "level 2" and "level 3".

To set the sensitivity level in accordance with the case of use of the battery-driven computer 1, the user can move the bar 2 to select the sensitivity level, for example, from "level 1", "level 2" and "level 3".

To set the sensitivity level in accordance with the ease of use of the battery-driven computer 1 in a tablet mode, the user can move the bar 3 to select the sensitivity level, for example, from "level 1", "level 2" and "level 3".

For example, the term "tablet mode" means a mode in which the user inputs data by pen while holding the computer 1. The state of the display unit relative to the hinge shaft can be discriminated to judge whether the tablet mode is used or not. When the user uses the computer 1 in the tablet mode, it is, for example, conceived that the user inputs data by pen while carrying the computer 1 without care of the inclination angle of the computer 1. On the assumption of such a method for using the computer 1, weak fluctuation with rotation can be prevented from being detected by mistake if "level 1" is selected as the default value of the sensitivity level in the tablet mode, that is, if occurrence of impact is predicted on the basis of only synthetic acceleration (X,Y, Z) of the three axes.

To set the sensitivity level in accordance with the case of use of the battery-driven computer 1 in the music reproducing mode, the user can move the bar 3 to select the sensitivity level, for example, from "level 1", "level 2" and "level 3".

For example, the term "music reproducing mode" means a mode in which the user uses an earphone to listen to music played back by the computer 1 while putting and carrying the computer 1 in a bag without care of the inclination angle of the computer 1. On the assumption of such a method as the method for using the music reproducing mode, weak fluctuation with rotation can be prevented from being detected by mistake if occurrence of impact is predicted on the basis of only synthetic acceleration (X, Y, Z) of the three axes.

Incidentally, as the table shown in FIG. 19, the default value of the sensitivity level in the case of use of the computer 1 having the AC adapter connected thereto can be selected to be "level 3", the default value of the sensitivity level in the case of use of the battery-driven computer 1 can be selected to be "level 2", the default value of the sensitivity level in the case of use of the battery-driven computer 1 in the tablet mode can be selected to be "level 1" and the default value of the sensitivity level in the case of use of the battery-driven computer 1 in the music reproducing mode can be selected to be "level 1". Next, an example of the utility 13c setting screen displayed for performing setting to temporarily increase the sensitivity level of the computer 1 will be described.

Figure 20:
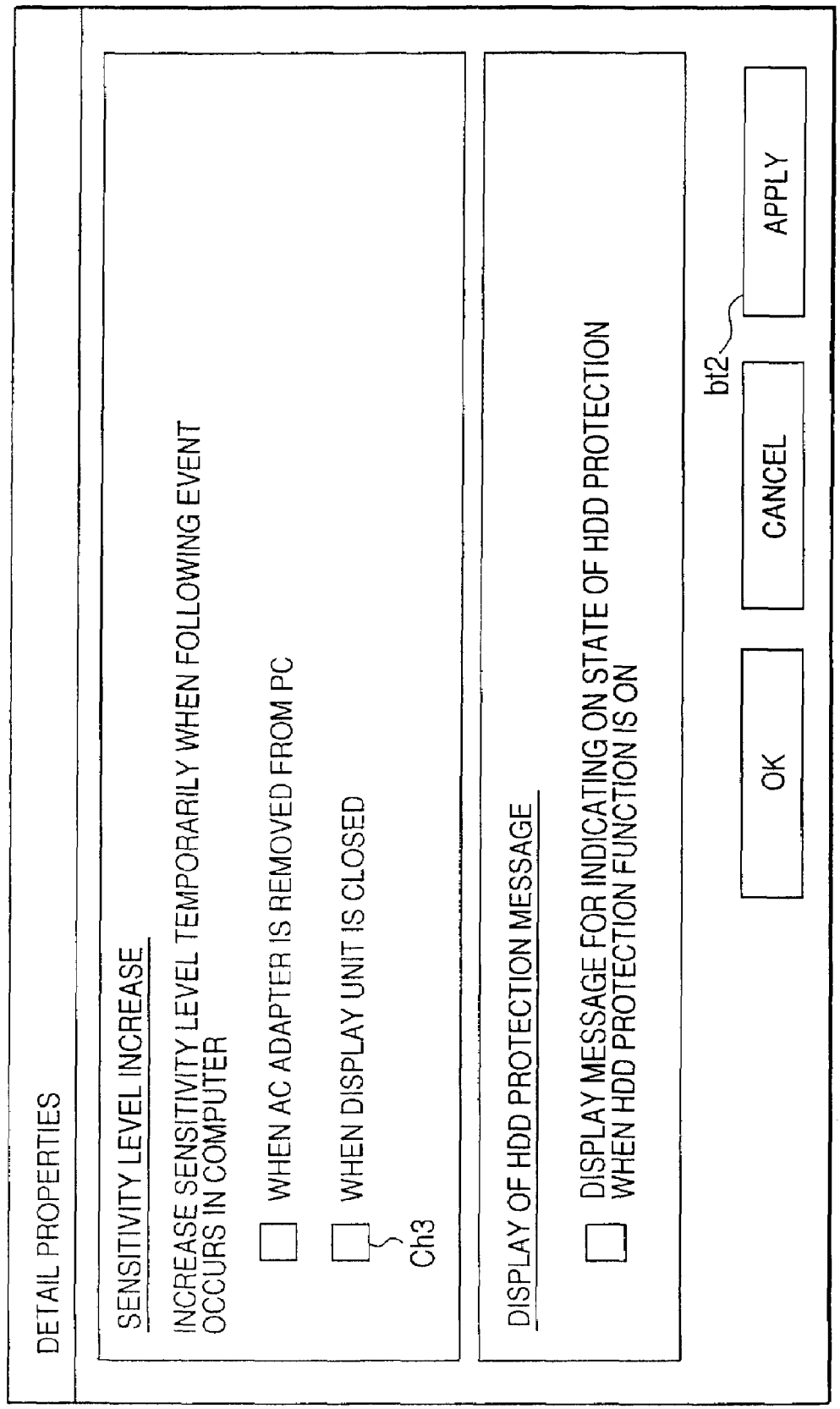
FIG. 20 is a table showing the relation between the case of use of the computer and the default value of the sensitivity level.

FIG. 20 is a view for explaining an example of the utility 13c setting screen displayed for performing setting to temporarily increase the sensitivity level of the computer 1.

The user can make the LCD 4 display the setting screen shown in FIG. 20 to perform setting to temporarily increase the sensitivity level when a predetermined event occurs in the computer 1.

The user can select (allow) the event "removal of the AC adapter from the computer 1" or "closure of the display unit 2" as a predetermined event to temporarily increase the sensitivity level.

For example, when the user wants to select the event "closure of the display unit 2" as an event to temporarily increase the sensitivity level, the user can check ch3. After checking ch3, the user can push down the apply button bt2.

When the user closes the display unit 2, for example, in the battery-driven computer 1 (in the sensitivity level "level 2") in the condition that the event "closure of the display unit 2" is selected as an event to temporarily increase the sensitivity level, the sensitivity level temporarily increases to "level 3".

Incidentally, as the table shown in FIG. 22, the default values of the events "removal of the AC adapter from the computer 1" and "closure of the display unit 2" can be selected (allowed) as events to temporarily increase the sensitivity level. Next, a control flow for temporarily increasing the sensitivity level and a control flow for selecting the sensitivity level in accordance with the case of use of the computer 1 will be described.

Figure 23:
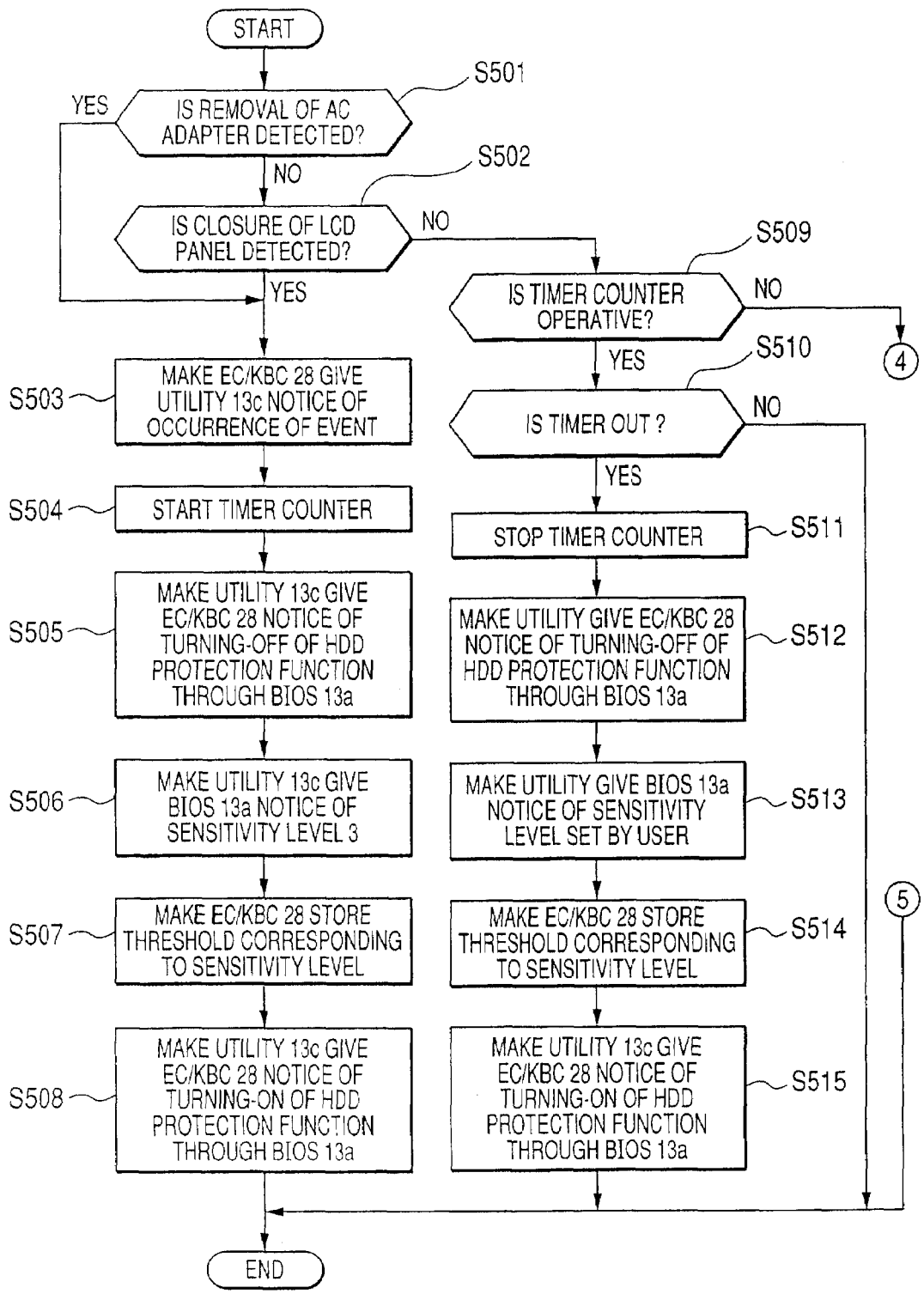
FIG. 23 is a flow chart for explaining an example of the control flow for temporarily increasing the sensitivity level.
Figure 24:
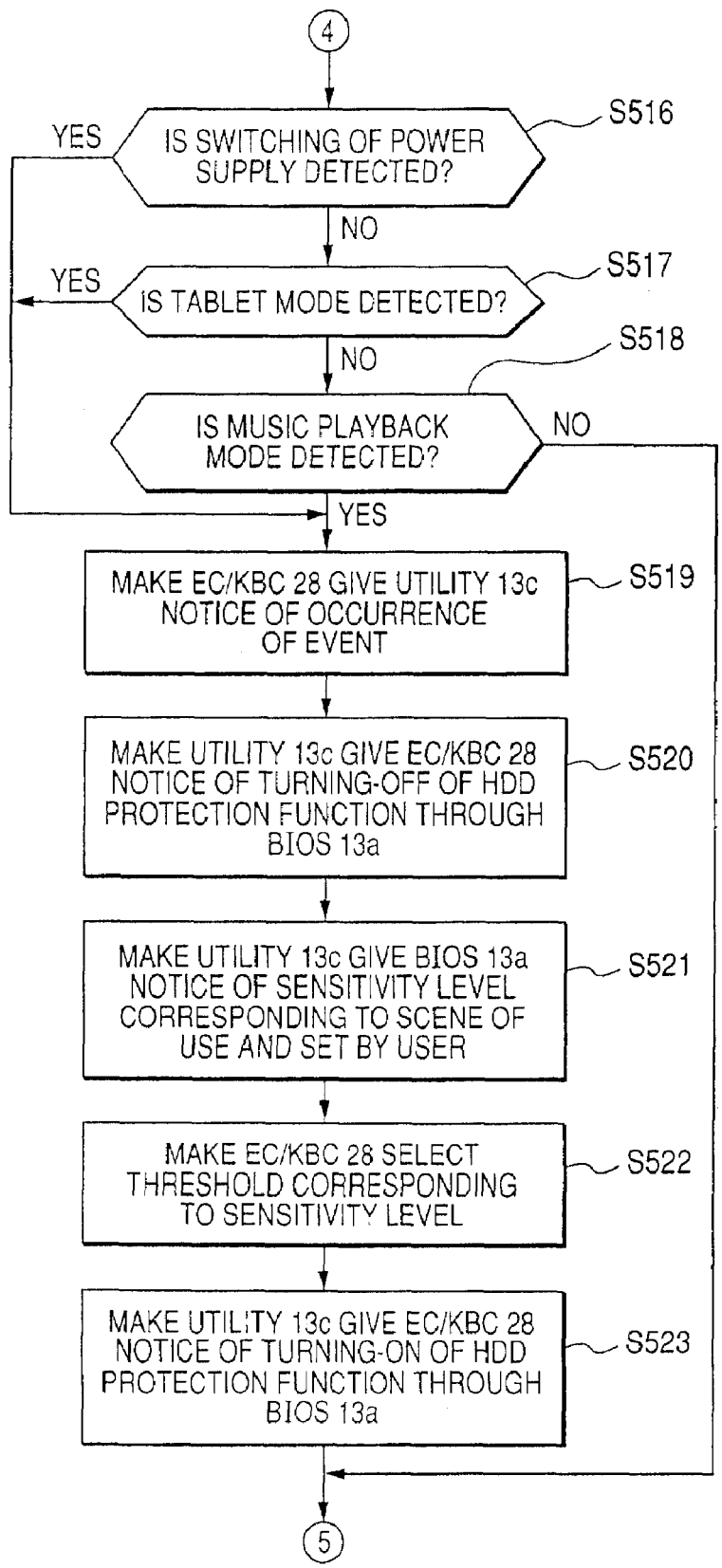
FIG. 24 is a flow chart for explaining an example of the control flow for selecting the sensitivity level in accordance with the case of use of the computer.

FIG. 23 is a flow chart showing an example of the control flow for temporarily increasing the sensitivity level. FIG. 24 is a flow chart showing an example of the control flow for selecting the sensitivity level in accordance with the case of use of the computer 1.

When the EC/KBC 28 detects removal of the AC adapter connected to the computer 1 (Yes in step S501) or when the EC/KBC 28 detects change of the display unit of the computer 1 from the open position to the close position relative to the body (Yes in step S502), the EC/KBC 28 sends an SMI (System Management Interrupt) signal to the I/O hub 20. The BIOS 13a executed by the CPU 10 executes an SMI (System Management Interrupt) process to inform the utility 13c of occurrence of these events (step S503).

Upon reception of the notice from the BIOS 13a, the utility 13c starts the operation of the timer counter included in the utility 13c (step S504).

When the operation of the timer counter in the utility 13c is started, the utility 13c resets the bit indicating "the on state of the HDD protection function" in the register 28c provided in the EC/KBC 28 to temporarily turn off the HDD protection function through the BIOS 13a (step S505).

When the utility 13c confirms that "the EC/KBC 28 is informed of the turning-off of the HDD protection function", the utility 13c informs the BIOS 13a of the highest sensitivity level "level 3" (step S506).

The BIOS 13a informs the EC/KBC 28 of the thresholds concerned with various kinds of acceleration in accordance with the sensitivity level "level 3" received from the utility 13c. The EC/KBC 28 stores the thresholds received from the BIOS 13a (step S507). Further, the utility 13c sets the bit indicating "the on state of the HDD protection function" in the register 28c provided in the EC/KBC 28 to turn on the HDD protection function through the BIOS 13a (step S508).

On the other hand, when removal of the AC adapter connected to the computer 1 is not detected (No in the step S501) and when change of the display unit of the computer 1 from the open position to the close position relative to the body is not detected (No in the step S502), the utility 13c judges whether the timer counter is operative or not (step S509) when the timer counter is operative (Yes in the step S509), the utility 13c judges whether time is out or not (step S510).

When time is out (Yes in the step S510), the utility 13c stops the operation of the timer counter (step S511).

When the utility 13c stops the operation of the timer counter, the utility 13c resets the bit indicating "the on state of the HDD protection function" in the register 28c provided in the EC/KBC 28 to turn off the HDD protection function through the BIOS 13a (step S512).

When the utility 13c confirms that "the EC/KBC 28 is informed of the turning-off of the HDD protection function", the utility 13c informs the BIOS 13a of the sensitivity level value selected by the user (step S513).

The BIOS 13a informs the EC/KBC 28 of the thresholds concerned with various kinds of acceleration in accordance with the sensitivity level value received from the utility 13c. The EC/KBC 28 stores the thresholds received from the BIOS 13a (step S514). Further, the utility 13c sets the bit indicating "the on state of the HDD protection function" in the register 28c provided in the EC/KBC 28 to turn on the HDD protection function through the BIOS 13a (step S515).

As described above, when the event "removal of the AC adapter from the computer 1" or "change of the display unit from the open position to the close position relative to the body" occurs, the possibility that the user will carry the computer is high. Accordingly, when controlling is performed to increase the sensitivity level for a predetermined time after occurrence of these events, preparation can be made for occurrence of impact on the HDD 21.

When the EC/KBC 28 detects that the power supply for driving the computer 1 is changed to AC-drive or battery-drive (Yes in step S516) or when the EC/KBC 28 detects that the mode of the computer 1 is changed to the tablet mode (Yes in step S517) or when the EC/KBC 28 detects that the mode of the computer 1 is changed to the music reproducing mode (Yes in step S518) in the case where the utility 13c confirms that the timer counter is inoperative (No in the step S509), the EC/KBC 28 sends an SMI (System Management Interrupt) signal to the I/O hub 20. The BIOS 13a executes an SMI process to thereby inform the utility 13c of occurrence of these events (step S519).

The utility 13c resets the bit indicating "the on state of the HDD protection function" in the register 28c provided in the EC/KBC 28 to turn off the HDD protection function through the BIOS 13a (step S520).

When the utility 13c confirms that "the EC/KBC 28 is informed of the turning-off of the HDD protection function", the utility 13c informs the BIOS 13a of the sensitivity level value selected by the user on the utility 13c setting screen in accordance with the state of use of the computer 1 (step S521).

The BIOS 13a informs the EC/KBC 28 of the thresholds concerned with various kinds of acceleration in accordance with the sensitivity level value received from the utility 13c. The EC/KBC 28 stores the thresholds received from the BIOS 13a (step S522). Further, the utility 13c sets the bit indicating "the on state of the HDD protection function" in the register 28c provided in the EC/KBC 28 to turn on the HDD protection function through the BIOS 13a (step S523). Next, control of the HDD protection function in the computer 1 having the docker connected thereto will be described.

Figure 25:
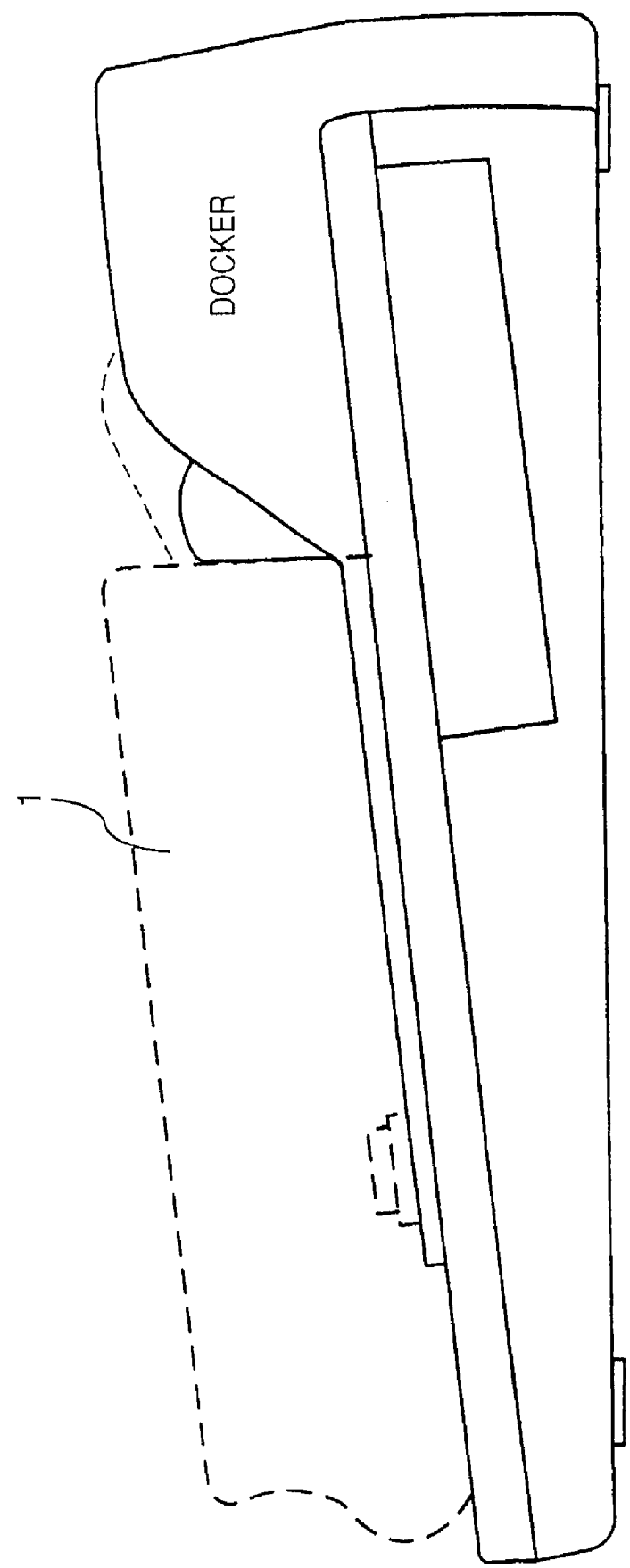
FIG. 25 is a view showing a state in which a docker is connected to the computer.
Figure 26:
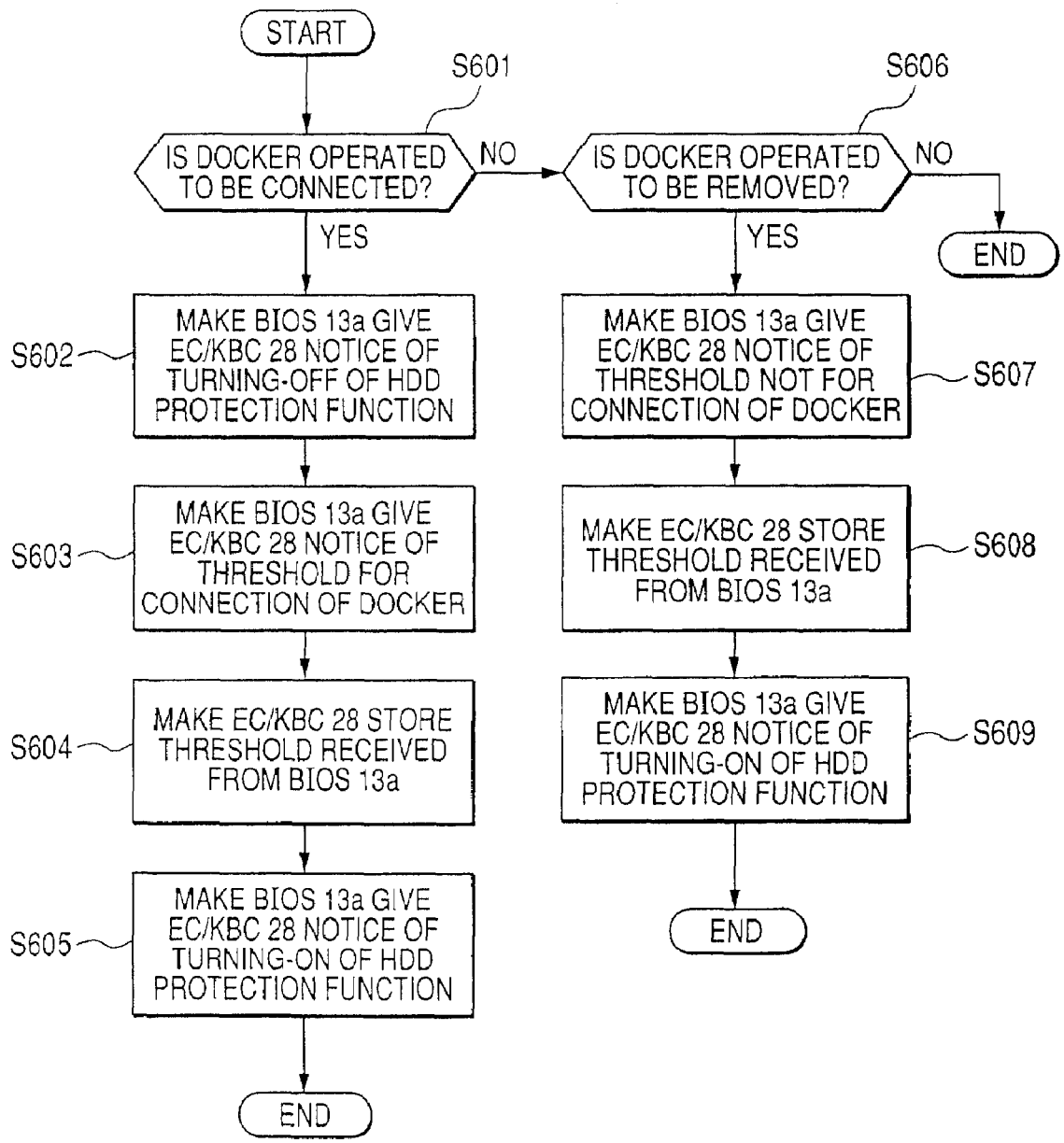
FIG. 26 is a view for explaining a control flow of the HDD protection function in the case where the docker is connected to the computer.
Figure 27:
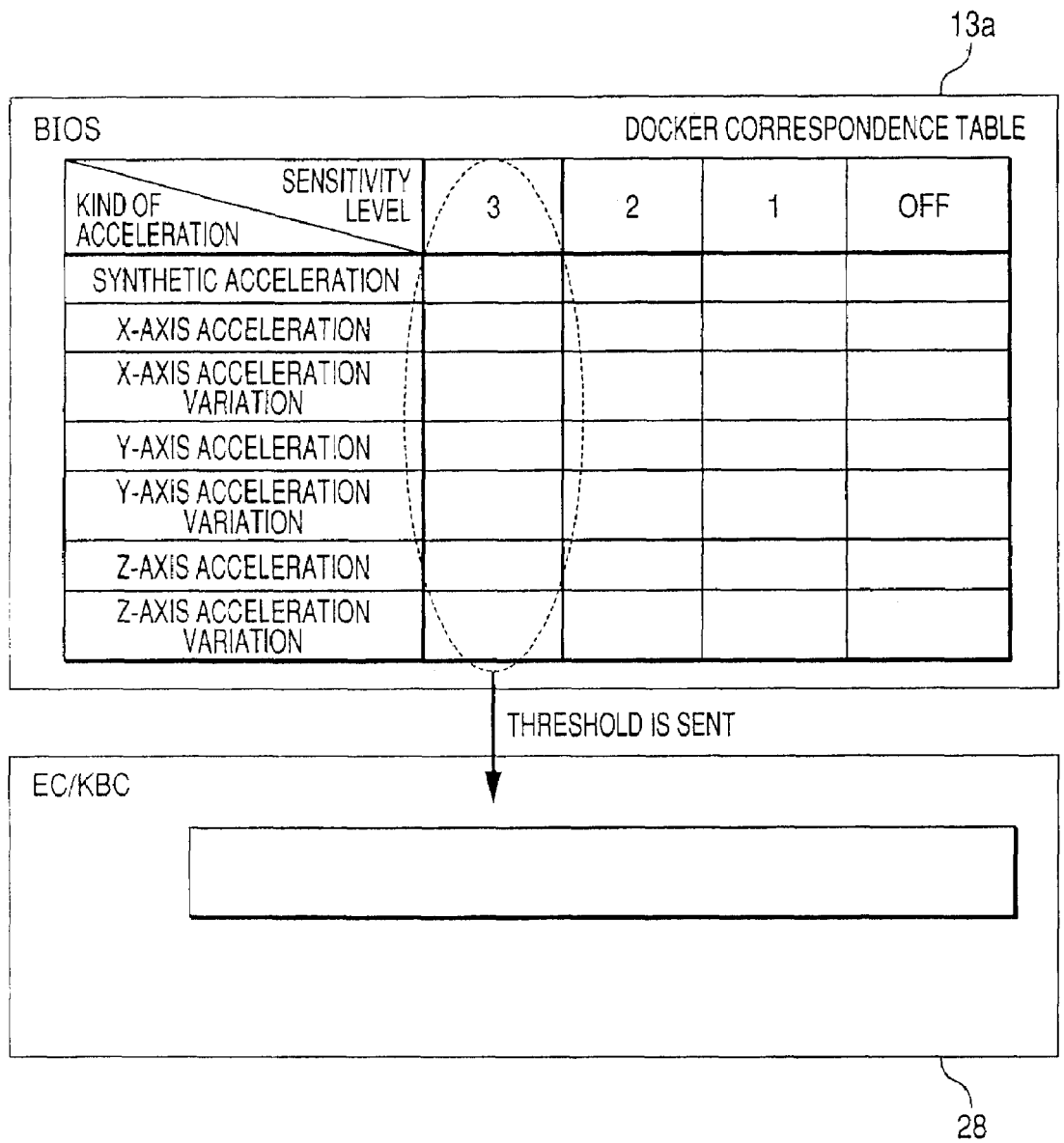
FIG. 27 is a view for explaining an example of the table selected by the. BIOS for achieving the HDD protection function in the case where the docker is connected to the computer.

FIG. 25 is a view showing a state in which the docker is connected to the computer 1. FIG. 26 is a flow chart for explaining a control flow of the HDD protection function in the case where the docker is connected to the computer 1. FIG. 27 is a view for explaining an example of the table selected in the BIOS 13a for achieving the HDD protection function in the case where the docker is connected to the computer 1.

When the docker is connected to the computer 1, the computer 1 is kept at a predetermined inclination angle from the horizontal plane (see FIG. 25). Therefore, a table in which thresholds concerned with various kinds of acceleration have values in consideration of the inclination of the computer 1 is provided separately (see FIG. 27).

When an operation for connecting the docker to the computer 1 is performed (Yes in step S601), the BIOS 13a informs the EC/KBC 28 of the turning-off of the HDD protection function (step S602).

The BIOS 13a informs the EC/KBC 28 of the thresholds in consideration of the inclination of the computer 1 (step S603). The EC/KBC 28 stores the thresholds received from the BIOS 13a (step S604). The BIOS 13a informs the EC/KBC 28 of the turning-on of the HDD protection function (step S605).

On the other hand, when an operation of removing the docker is performed (Yes in step S606), the BIOS 13a informs the EC/KBC 28 of the thresholds (see FIG. 18) without consideration of the inclination of the computer 1 (step S607). The EC/KBC 28 stores the thresholds received from the BIOS 13a (step S608). The BIOS 13a informs the EC/KBC 28 of the turning-on of the HDD protection function (step S609).

The invention is not limited to the embodiments and the constituent members of the embodiments may be changed for embodying the invention without departing the gist of the invention in the practical stage. The constituent members disclosed in the embodiments may be combined suitably for constituting various inventions. For example, several constituent members may be removed from the all constituent members of each embodiment. In addition, constituent members in different embodiments may be combined suitably.

What is claimed is:

1. An electronic apparatus comprising:
    a body;
    a triaxial acceleration sensor configured to detect an acceleration applied on the body and to acquire processed acceleration values respectively corresponding to fluctuation types;
    a state sensor configured to detect a state of the electronic apparatus and to set a sensitivity for the fluctuation types;
    a disk device that is built in the body and stores data;
    a controller configured to execute a protection function to protect the disk device when the processed acceleration values exceed threshold values set based on the sensitivity; and
    a secondary battery,
    wherein the state sensor includes a power supply controller configured to determine whether a power is supplied form an AC adapter or the secondary battery, and
    wherein the sensitivity is determined based on a detected result of the power supply controller.

2. The electronic apparatus according to claim 1, wherein the controller executes the protection function by selectively comparing the processed acceleration values and the threshold values.

3. The electronic apparatus according to claim 2, wherein the fluctuation types include:
    a free fall fluctuation,
    an external force fluctuation,
    an X-axis rotation fluctuation,
    a Y-axis rotation fluctuation, and
    a Z-axis rotation fluctuation, and
    wherein each of the threshold values is set for corresponding one of the fluctuation types.

4. The electronic apparatus according to claim 1, wherein the sensitivity is enhanced for a certain period of time when a power source is changed from the AC adapter to the secondary battery.

5. The electronic apparatus according to claim 1, further comprising:
    a display unit which is attached to the body,
    wherein the state sensor determines whether an operation mode of the electronic apparatus is a tablet mode, and
    wherein the sensitivity is determined based on a detected result of the state sensor.

6. The electronic apparatus according to claim 1, wherein the processed acceleration values include:
    a synthetic acceleration value,
    an acceleration value acting in a Z-axis,
    a variation of the acceleration value acting in the Z-axis,
    an acceleration value acting in a Y-axis,
    a variation of the acceleration value acting in the Y-axis,
    an acceleration value acting in an X-axis, and
    a variation of the acceleration value acting in the Z-axis.

7. A disk protection method executed in an electronic apparatus including a body, a triaxial acceleration sensor, and a disk device built in the body, the disk protection method comprising:
    detecting an acceleration applied on the body and acquiring processed acceleration values respectively corresponding to fluctuation types;
    detecting a state of the electronic apparatus and setting a sensitivity for the fluctuation types;
    executing a protection function to protect the disk device when the processed acceleration values exceed threshold values set based on the sensitivity; and
    determining whether a power, is supplied from an AC adapter or a secondary battery, and determining the sensitivity based on a detected result of the power supply.

8. The disk protection method according to claim 7, further comprising:
    enhancing sensitivity for a certain period of time when a power source is changed from the AC adapter to the secondary battery.

9. The disk protection method according to claim 7, further comprising:
    determining whether an operation mode of the electronic apparatus is in a tablet mode, and
    wherein the sensitivity is determined based on a detected result of the state sensor.

10. An electronic apparatus comprising:
    a body;

a triaxial acceleration sensor configured to detect an acceleration applied on the body and to acquire processed acceleration values respectively corresponding to fluctuation types;

a state sensor configured to detect a state of the electronic apparatus and to set a sensitivity for the fluctuation types;

a disk device that is built in the body and stores data;

a controller configured to execute a protection function to protect the disk device when the processed acceleration values exceed threshold values set based on the sensitivity; and a display unit which is attached to the body, wherein the state sensor includes an open-close detection portion configured to determine whether the display unit is in a closed state or an opened state against the body, and wherein the sensitivity is determined based on a detected result of the open-close detection portion.

11. The electronic apparatus according to claim 10, wherein the sensitivity is enhanced for a certain period of time when the opened state is changed to the closed state.

12. A disk protection method executed in an electronic apparatus including a body, a triaxial acceleration sensor, and a disk device built in the body, the disk protection method comprising:

detecting an acceleration applied on the body and acquiring processed acceleration values respectively corresponding to fluctuation types;

detecting a state of the electronic apparatus and setting a sensitivity for the fluctuation types;

executing a protection function to protect the disk device when the processed acceleration values exceed threshold values set based on the sensitivity; and determining by an open close detection portion whether a display unit attached to the body is in closed state or an opened state against the body, and wherein the sensitivity is determined based on a detected result of the open-close detection portion.

13. The disk protection method according to claim 12, wherein the sensitivity is enhanced for a certain period of time when the opened state is changed to the closed state.

14. An electronic apparatus comprising:

a body;

a triaxial acceleration sensor configured to detect an acceleration applied on the body and to acquire processed acceleration values respectively corresponding to fluctuation types;

a state sensor configured to detect a state of the electronic apparatus and to set a sensitivity for the fluctuation types;

a disk device that is built in the body and stores data;

a controller configured to execute a protection function to protect the disk device when the processed acceleration values exceed threshold values set based on the sensitivity;

a secondary battery; and a display unit which is attached to the body, wherein the state sensor includes a power supply controller configured to determine whether a power is supplied form an AC adapter or the secondary battery, wherein the state sensor determines whether an operation mode of the electronic apparatus is a tablet mode, wherein the sensitivity is determined based on a detected result of the state sensor, and wherein the sensitivity is lowered for a certain period of time when the operation mode is changed to the tablet mode.

15. A disk protection method executed in an electronic apparatus including a body, a triaxial acceleration sensor, and a disk device built in the body, the disk protection method comprising:

detecting an acceleration applied on the body and acquiring processed acceleration values respectively corresponding to fluctuation types;

detecting a state of the electronic apparatus and setting a sensitivity for the fluctuation types;

executing a protection function to protect the disk device when the processed acceleration values exceed threshold values set based on the sensitivity;

determining whether a power is supplied from an AC adapter or a secondary battery, and determining the sensitivity based on a detected result of the power supply; and determining whether an operation mode of the electronic apparatus is in a tablet mode and wherein the sensitivity is determined based on a detected result of the state sensor, and wherein the sensitivity is lowered for a certain period of time when the operation mode is changed to the tablet mode.

* * * * *